United States Patent
Maniwa

(10) Patent No.: US 7,394,495 B2
(45) Date of Patent: Jul. 1, 2008

(54) DISPLAY CHANGEOVER CONTROL IN IMAGE SENSING APPARATUS

(75) Inventor: Junichi Maniwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 920 days.

(21) Appl. No.: 10/831,328

(22) Filed: Apr. 26, 2004

(65) Prior Publication Data

US 2005/0174458 A1 Aug. 11, 2005

(30) Foreign Application Priority Data

Feb. 6, 2004 (JP) .............................. 2004-031408

(51) Int. Cl.
- H04N 3/14 (2006.01)
- H04N 5/335 (2006.01)

(52) U.S. Cl. .............................. 348/333.11

(58) Field of Classification Search ............ 348/333.01, 348/333.06, 333.11, 333.13
See application file for complete search history.

(56) References Cited

U.S. PATENT DOCUMENTS

| | | | | |
|---|---|---|---|---|
| 6,393,222 | B1* | 5/2002 | Nakagawa et al. | 348/333.06 |
| 7,071,976 | B2* | 7/2006 | Kaibara | 348/231.99 |
| 2001/0008424 | A1* | 7/2001 | Higuchi et al. | 348/333.02 |
| 2001/0043277 | A1* | 11/2001 | Tanaka et al. | 348/333.01 |
| 2002/0028076 | A1* | 3/2002 | Okubo | 396/429 |
| 2002/0149682 | A1* | 10/2002 | Kudo | 348/333.06 |
| 2002/0171747 | A1* | 11/2002 | Niikawa et al. | 348/333.01 |
| 2003/0142971 | A1 | 7/2003 | Nishiwaki et al. | 396/176 |
| 2004/0061797 | A1* | 4/2004 | Takahashi et al. | 348/333.01 |
| 2004/0201767 | A1* | 10/2004 | Niikawa et al. | 348/333.11 |
| 2005/0001924 | A1* | 1/2005 | Honda | 348/348 |
| 2005/0052553 | A1* | 3/2005 | Kido et al. | 348/333.01 |

FOREIGN PATENT DOCUMENTS

| | | | |
|---|---|---|---|
| JP | 10186964 A | * | 7/1998 |
| JP | 2001-177742 | | 6/2001 |
| JP | 2002-209125 | | 7/2002 |

* cited by examiner

*Primary Examiner*—Lin Ye
*Assistant Examiner*—Jason Whipkey
(74) *Attorney, Agent, or Firm*—Fitzpatrick, Cella, Harper & Scinto

(57) ABSTRACT

There is provided an image sensing apparatus which electrically senses an object and stores obtained image data in a storage medium, having an LCD, an EVF, a display device changeover button to, while displaying image data on one of the LCD and the EVD in each of a plurality of different display modes, select one of the LCD and the EVD in each of the plurality of display modes by changing over a display destination of the image data to the other one, a memory which stores one of the LCD and the EVF selected by the display device changeover button for each of the plurality of display modes, and a display control unit which controls to display image data on the one of the LCD and the EVF stored in the memory in accordance with the display mode.

10 Claims, 25 Drawing Sheets

DISPLAY CHANGEOVER CONTROL IN IMAGE SENSING APPARATUS

FIELD OF THE INVENTION

The present invention relates to an image sensing apparatus which comprises a plurality of image display devices, and a method of controlling the apparatus.

BACKGROUND OF THE INVENTION

There is conventionally available a digital camera including a plurality of display devices such as an electronic viewfinder (EVF), a liquid crystal display (LCD), and the like.

In such a digital camera, generally, an EVF provided at a finder unit of the camera is used in image sensing process to perform framing while viewing a displayed moving picture (live display). After sensing an image, an LCD provided on the back of the camera is used to display a sensed image.

As an example of such a digital camera including a plurality of display devices, an image sensing apparatus (see, e.g., Japanese Patent Laid-Open No. 2002-209125) has a designation switch for designating an EVF, LCD, or automatic selection as a display device for image display. As another example, a digital camera (see, e.g., Japanese Patent Laid-Open No. 2001-177742) stores in advance a plurality of combinations of the kinds of images to be displayed and display devices which display the images determined on the basis of the contents of the images and a user can select a favorite one from the combinations by operating a changeover button.

As still another example, a digital camera has a review display function which displays a sensed image immediately after the image sensing process still in an image sensing mode in addition to playback mode of displaying a sensed image on a display device. The digital camera performs review display by operating a review button and makes it possible to easily check the composition, focus, exposure, and the like of the sensed image.

As still another example, a digital camera has the same arrangement as that of the above-mentioned camera and can be set in advance from a menu screen such that an LCD is preferentially used to perform review display for a sensed image. The digital camera uses an EVF in image sensing process and automatically changes over a display device to be used to the LCD upon operation of a review button to perform review display.

If the above-mentioned digital camera has no function of preferentially using an LCD, a display device for live display used in image sensing process performs review display subsequent to live display. That is, if an EVF is used in image sensing process, the EVF is also used in review display. An EVF generally has a smaller image display area, a smaller number of display pixels, and a lower display resolution than an LCD. Accordingly, it is difficult to strictly check the focus and the like of a sensed image if the image is displayed on the EVF. To perform review display using the LCD, the LCD must be used in image sensing process. In this case, the camera is often held unstably, and a camera shake is likely to occur. In an environment too bright to ensure the visibility of an LCD, like in sunlight, image sensing process itself may be difficult.

For this reason, to perform live display using the EVF and perform review display using the LCD, the following operation is performed. More specifically, the EVF is set as a display device to be used. After image sensing process, the review button is operated to perform review display on the EVF. During the review display, the display device for display is changed over from the EVF to the LCD.

In the above-mentioned arrangement, either one of the EVF and the LCD is set as the display device for image display. When review ends, and the process returns to live display, the LCD is still set. To resume image sensing process using the EVF, the display device needs to be changed over from the LCD selected in review to the EVF. This operation is troublesome.

The above-mentioned operation must be repeated every time after review display, and this greatly decreases the operability. During display device changeover operation, chances to release the shutter may be missed.

Assume that the digital camera which has the function of preferentially using the LCD is so set as to preferentially use the LCD to display a sensed image. To perform review display using the EVF due to the environment (e.g., an environment too bright to ensure the visibility of the LCD), change operation such as cancellation of a setting for preferentially using the LCD in the setup menu screen of the camera must be performed each time.

Even in digital cameras having the above-mentioned arrangements, a display device used in image sensing process is used to perform quick review display which automatically displays a sensed image after image sensing process without any operation of a review button.

The digital camera described in Japanese Patent Laid-Open No. 2001-177742 can select a combination only from the predetermined combinations. Since the user does not know on which display device which type of image is to be displayed in each combination until the changeover button is operated to display actual images, it may take long to select a combination or the user may not find a favorite one in the combinations.

SUMMARY OF THE INVENTION

The present invention has been made in consideration of the above situation, and has as its object to, in an image sensing apparatus having a plurality of display devices, enable to select and set with a simple operation any one of the display devices as a display device for image display in each display mode in accordance with surrounding circumstances and user preferences.

According to the present invention, the foregoing object is attained by providing an image sensing apparatus which electrically senses an object and stores obtained image data in a storage medium, comprising a plurality of image display units; a selection unit which, while displaying image data on one of the plurality of image display units in each of a plurality of different display modes, selects an image display unit for image data display in each of the plurality of display modes out of the plurality of image display units by changing a display destination of the image data to another image display device; a storage unit which stores the image display unit selected by the selection unit for each of the plurality of display modes; and a display control unit which controls to display image data on the image display unit stored in the storage unit in accordance with the display mode.

According to the present invention, the foregoing object is also attained by providing a method of controlling an image sensing apparatus which has a plurality of image display units, electrically senses an object, and stores obtained image data in a storage medium, comprising determining a display mode to be used out of a plurality of different display modes; displaying image data on one of the plurality of image display units in accordance with the determined display mode;

changing over a display destination of the image data to another one of the plurality of the image display units; and storing the another image display unit in association with the determined display mode, wherein the changing over and storing are independently performed for the respective display modes, and in the displaying, control is so performed as to display image data on the stored image display unit in accordance with the display mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
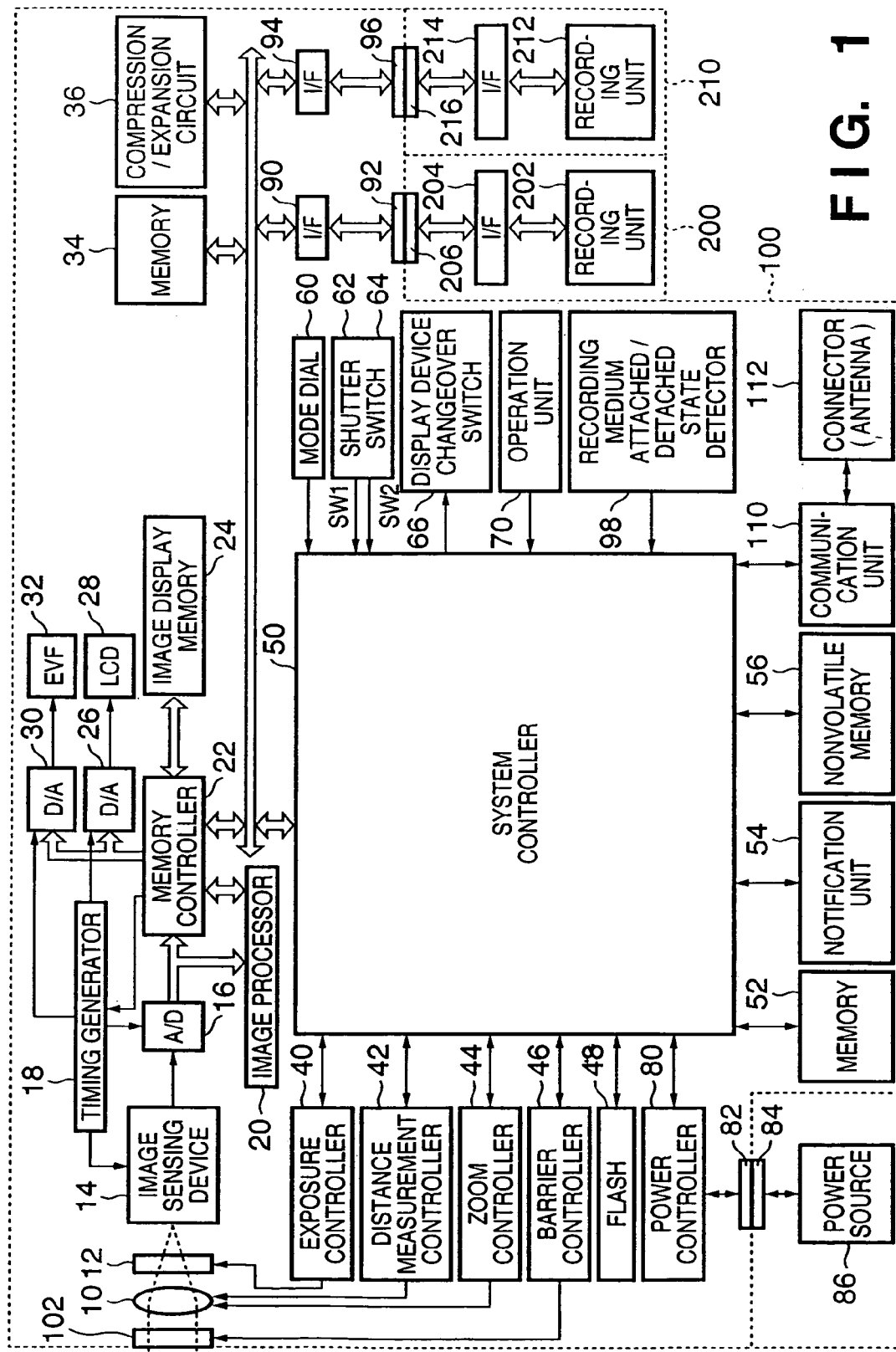
FIG. 1 is a block diagram showing the arrangement of an image sensing apparatus according to an embodiment of the present invention.

FIG. 1 is a block diagram showing a configuration of an image sensing apparatus according to an embodiment of the present invention.

In FIG. 1, reference numeral 100 denotes an image sensing apparatus. The image sensing apparatus may be a digital camera, digital video camera, or mobile terminal with camera (including mobile phone with camera), for instance. In this embodiment, the image sensing apparatus assumes to be a digital camera.

In the image sensing apparatus 100, 10 denotes an image sensing lens; 12, a shutter having a diaphragm function; 14, an image sensing device which converts an optical image into an electric signal; 16, an A/D converter which converts an analog signal output from the image sensing device 14 into a digital signal.

Reference numeral 18 denotes a timing generator which supplies a clock signal and a control signal respectively to the A/D converter 16, and D/A converters 26 and 30, under the control of a memory controller 22 and a system controller 50.

Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converters 26 and 30, a memory 34 and a compression/expansion circuit 36. The image data outputted from the A/D converter 16 is written into the image display memory 24 or the memory 34 via the image processor 20 and the memory controller 22, or only via the memory controller 22.

Numeral 24 denotes the image display memory; 26, the D/A converter; 28, an image display unit comprising a liquid crystal display (LCD) or the like; 30, the D/A converter; and 32, the electronic viewfinder (EVF). Image data written into the image display memory 24 is displayed on the LCD 28 via the D/A converter 26 or on the EVF 32 via the D/A converter 30.

An electronic finder function is realized by sequentially display obtained images on the LCD 28 or EVF 32. Further, the LCD 28 and/or EVF 32 arbitrarily turns ON/OFF its display, in accordance with an instruction from the system controller 50. If the display of the LCD 28 and/or EVF 32 is turned OFF, the electric consumption of the image processing apparatus 100 can be greatly reduced.

The memory 34, used for storing obtained still images and moving images, has a sufficient storage capacity for storing a predetermined number of still images and a moving image for a predetermined period. In sequential image sensing to sequentially obtain a plural number of still images or panoramic image sensing, a large amount of image data can be written into the memory 34 at a high speed. Further, the memory 34 may be used as a work area for the system controller 50.

The compression/expansion circuit 36 compresses or expands image data by adaptive discrete cosine transformation (ADCT) or the like. The compression/expansion circuit 36 reads image data stored in the memory 34 and performs compression or expansion processing on the read image data, and writes the processed data into the memory 34.

The exposure controller 40 controls the shutter 12 having the diaphragm function. The exposure controller 40 interlocked with a flash 48 also has a flash adjusting function. The distance measurement controller 42 controls focusing of the image sensing lens 10. Numeral 44 denotes a zoom controller which controls zooming of the image sensing lens 10. Numeral 46 denote a barrier controller which controls the operation of a barrier 102 to protect the lens. The flash 48 has an AF auxiliary light projection function and a flash adjusting function. As described above, the system controller 50 controls the exposure controller 40 and the distance measurement controller 42 by the TTL method, in accordance with the result of calculations by the image processor 20 based on the image data from the A/D converter 16.

The system controller 50 controls the overall image sensing apparatus 100. Memory 52 stores the constants, variables, and programs for operation of the system controller 50.

Numeral 54 denotes a notification unit which notifies operating statuses, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image processing apparatus 100. Further, a part of functions of the notification unit 54 is provided within an optical finder.

The display contents of the notification unit 54, displayed on the LCD or the like, include indication of single shot/sequential image sensing, a self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, attached/detached status of recording media 200 and 210, operation of communication I/F, and date and time.

Further, the display contents of the notification unit 54 using LEDs or the like arranged around the optical finder, include a focus state, a camera shake warning, a flash charge state, the shutter speed, the f number (aperture), and the exposure compensation.

Numeral 56 denotes an electrically erasable and recordable nonvolatile memory such as an EEPROM.

Numerals 60, 62, 64, 66 and 70 denote operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

Numeral 60 denotes a mode dial switch for selecting various function modes such as a power OFF mode, an automatic image sensing mode, an image sensing mode, a panoramic image sensing mode, a playback mode, a multi-image reproduction/deletion mode, and a PC connection mode.

Numeral 62 denotes a shutter switch SW1 turned ON by half stroke of a shutter button (not shown), to instruct start of the operations of the AF processing, the AE processing, the AWB processing, the EF processing and the like.

Numeral 64 denotes a shutter switch SW2 turned ON by full stroke of the shutter button (not shown), to instruct start of a series of operations of exposure processing to write a signal read from the image sensing device 14 into the memory 34, via the A/D converter 16 and the memory controller 22, development processing by using calculations by the image processor 20 and the memory controller 22, and recording processing to read the image data from the memory 34, compress the image data by the compression/expansion circuit 36, and write the compressed image data into the recording medium 200 or 210.

A display device changeover switch 66 instructs which of the LCD 28 or EVF 32 is to be used to perform displaying of an electronic view finder image or a sensed image.

Numeral 70 denotes an operation unit comprising various buttons and touch panels including a menu button, a set button, a macro/non-macro selection button, a multi-image reproduction/repaging button, a flash setting button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure correction button, and a date/time set button.

Numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Numerals 82 and 84 denote connectors; and 86, the power source comprising a primary battery such as an alkaline battery or a lithium battery, a secondary battery such as an NiDd battery, an NiMH battery or an Li battery, an AC adapter, and the like.

Numerals 90 and 94 denote interfaces for recording media such as a memory card or a hard disk; and 92 and 96, connectors for connection with the recording media such as a memory card or a hard disk. A recording medium attached/ detached state detector 98 detects whether recording medium 200 and/or 210 is attached to the connector 92 and/or connector 96.

In the present embodiment, two systems of interfaces and connectors for connection with the recording media are employed. However, the number of systems is not limited, and a single or plurality of interfaces and connectors may be provided. Further, interfaces and connectors pursuant to different standards may be combined.

As the interfaces and connectors, cards in conformity with Personal Computer Memory Card International Association standards (PCMCIA cards) and cards in conformity with compact flash© (CF) card standards may be used. In a case where cards and connectors in conformity with the PCMCIA standards, CF card standards and the like are used as the interfaces 90 and 94 and the connectors 92 and 96, image data and management information attached to the image data are transmitted/received with respect to other peripheral devices such as a computer and a printer by connection with various communication cards such as a LAN card, a modem card, a USB card, an IEEE 1394 card, a P1284 card, an SCSI card and a PHS card.

The barrier 102 covers the image sensing portion of the image sensing apparatus 100 including the lens 10, thus prevents dirt and breakage of the image sensing portion.

A communication unit 110 has various communication functions for RS232C, USB, IEEE 1394, P1284, SCSI, modem, LAN, and wireless communication.

A connector/antenna 112 functions as a connector when the image processing apparatus 100 is connected to another device via the communication unit 110, and as an antenna for wireless communication.

The recording media 200 and 210 comprise memory cards, hard disks or the like. The recording media 200 and 210 have recording units 202 and 212 of a semiconductor memory, a magnetic disk or the like, the interfaces 204 and 214 for communication with the image processing apparatus 100, and the connectors 206 and 216 for connection with the image processing apparatus 100, respectively.

First Embodiment

Operation according to the first embodiment of an image sensing apparatus 100 which has the above-mentioned arrangement will be described.

FIGS. 2 to 7 are flowcharts showing display device changeover operation in an image sensing mode according to the first embodiment.

Figure 2:
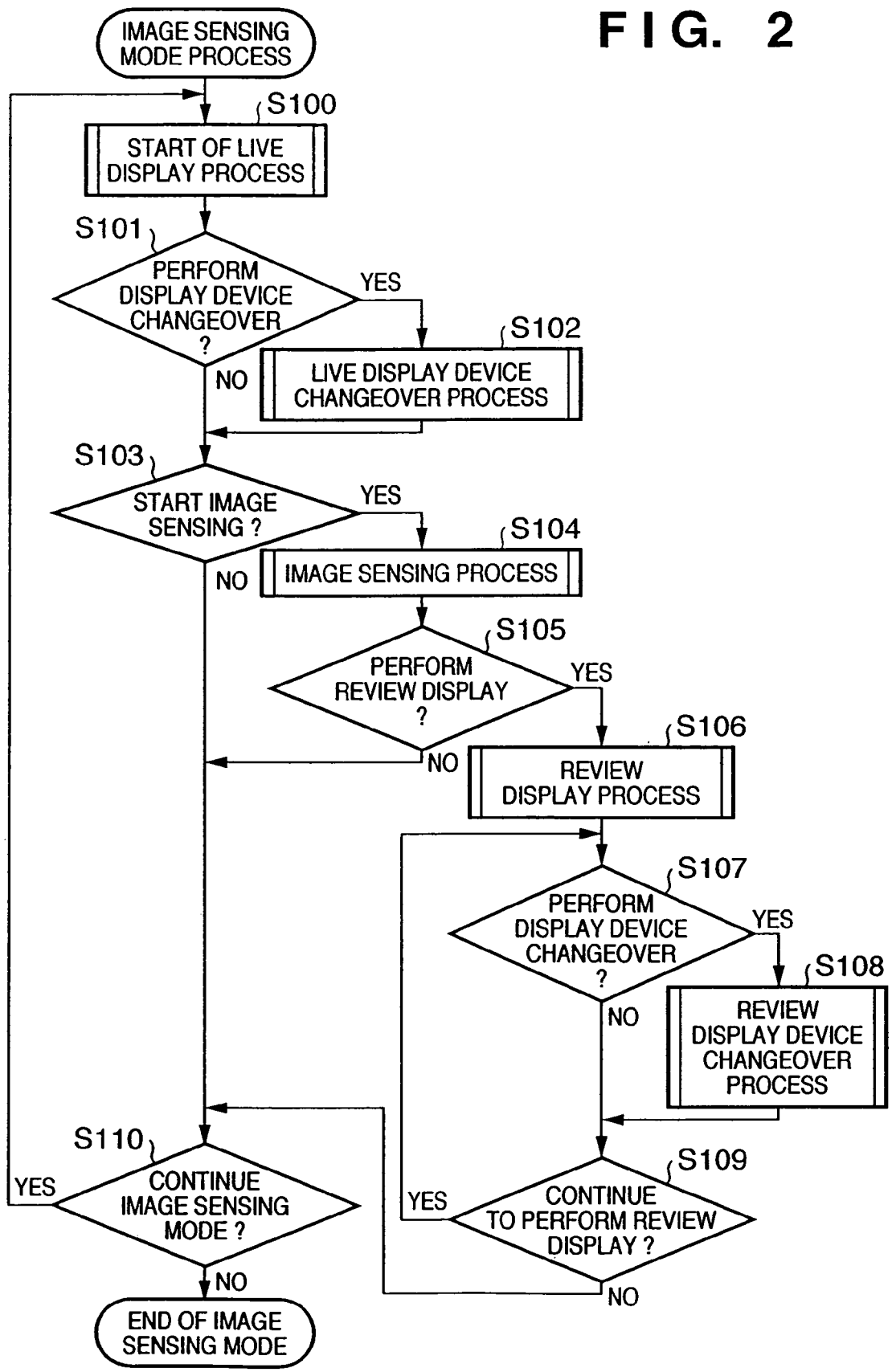
FIG. 2 is a flowchart showing a process in an image sensing mode according to a first embodiment of the present invention.

When the image sensing mode is selected using the mode dial 60, the image sensing apparatus 100 starts operation in the image sensing mode. In step S100, the system controller 50 starts a live display process (live display mode) which sequentially displays sensed image data, as shown in FIG. 2. In the live display process, the LCD 28 or the EVF 32 sequentially displays, through the memory controller 22 and D/A converter 26 or D/A converter 30, data which is sequentially written in the image display memory 24 through an image sensing device 14, A/D converter 16, image processor 20, and memory controller 22. This implements an electronic viewfinder function.

Figure 3:
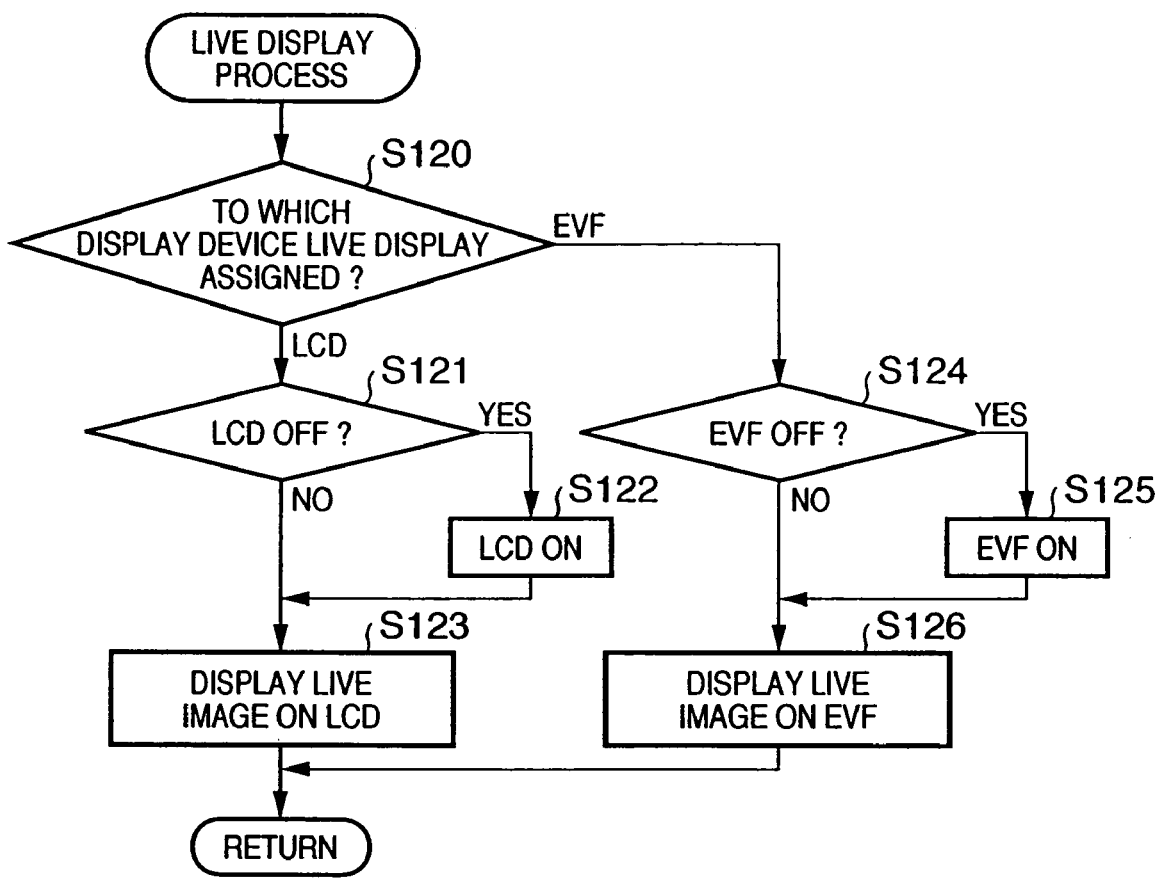
FIG. 3 is a flowchart of a live display process according to the first embodiment of the present invention.

FIG. 3 is a flowchart showing in detail the live display process performed in step S100 of FIG. 2.

In step S120, it is determined to which display device live display is assigned. If the LCD is assigned, the flow advances to step S121. If the LCD 28 is in the OFF state, the flow advances to step S122 to turn on the LCD 28. Then, a live image is displayed on the LCD 28 (step S123).

On the other hand, if it is determined in step S120 that the EVF is assigned to the live display, the flow advances to step S124. If the EVF 32 is in the OFF state, the flow advances to step S125 to turn on the EVF 32. Then, the live image is displayed on the EVF 32 (step S126). After the live display in step S123 or S126, the flow returns to FIG. 2.

In step S101 of FIG. 2, it is determined whether a display device changeover switch 66 is operated during the live display. If NO in step S101, the flow advances to step S103; otherwise, the flow advances to step S102 to perform a live display changeover process.

Figure 4:
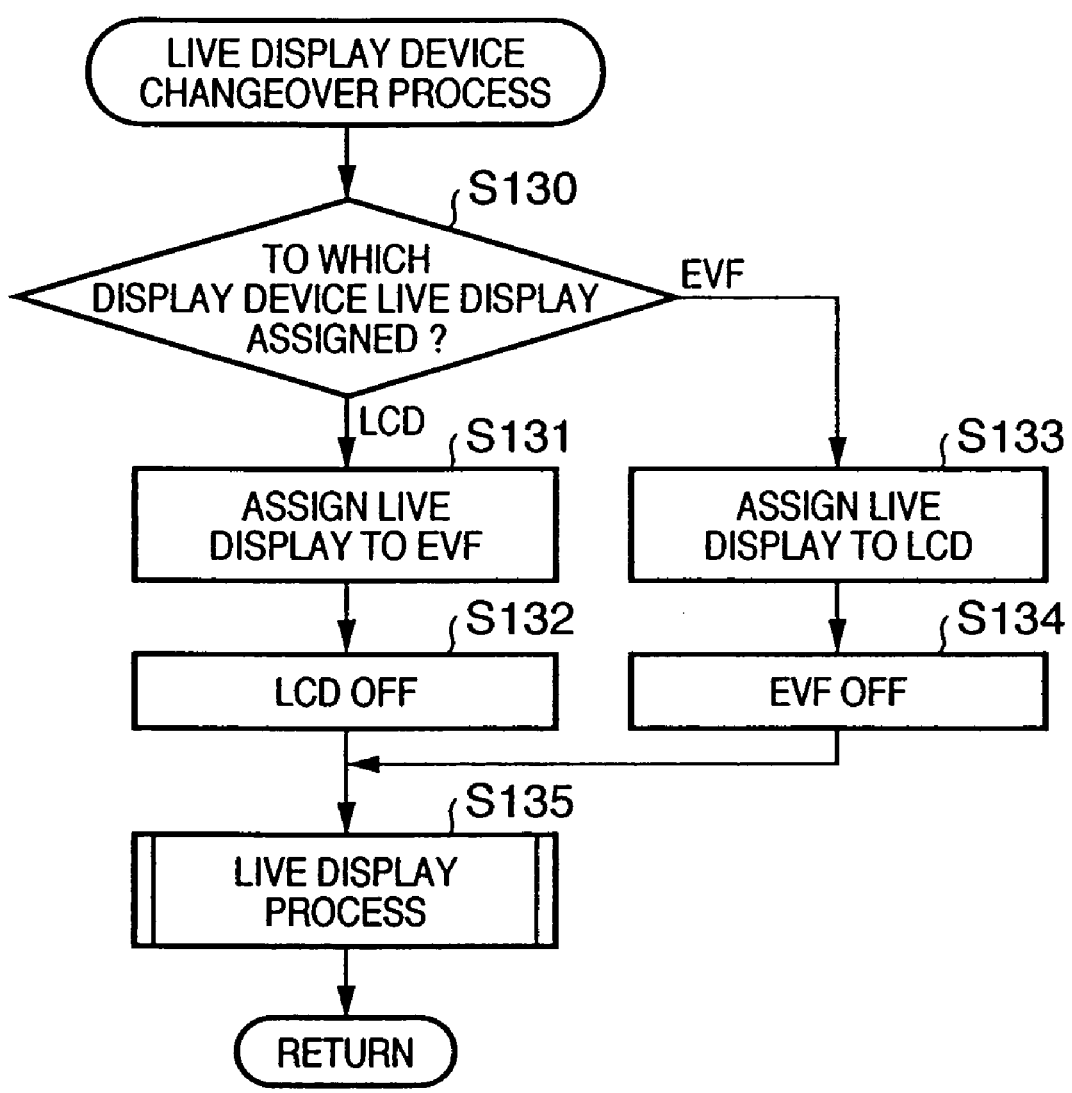
FIG. 4 is a flowchart of a live display device changeover process according to the first embodiment of the present invention.

FIG. 4 is a flowchart showing in detail the live display device changeover process in step S102.

In step S130, it is determined to which display device the live display is currently assigned. If the LCD is assigned, the flow advances to step S131 to change the assignment of the live display to the EVF. In step S132, the LCD 28 is turned off, and the flow advances to step S135.

On the other hand, if it is determined in step S130 that the live display is assigned to the EVF, the flow advances to step S133 to change the assignment to the LCD. In step S134, the EVF 32 is turned off, and the flow advances to step S135. In step S135, the live display process described with reference to FIG. 3 is performed. After the process, the flow returns to FIG. 2. It should be noted that the processes in steps S132 and S134 need not be performed at the above-mentioned timings. For example, the processes may be performed after the live display process or may not be performed.

This operation of the display device changeover switch 66 during live display makes it possible to easily select, set, and store a display device to be used for live display. The selected result of the display device for live display is stored in an internal memory of the system controller 50, the memory 52, or the nonvolatile memory 56.

In step S103 of FIG. 2, it is determined whether a shutter switch 64 (SW2) is operated during live display. If NO in step S103, the flow advances to step S110. If the switch is operated to give an image sensing start instruction, in step S104, the system controller 50 performs an image sensing process.

Figure 5:
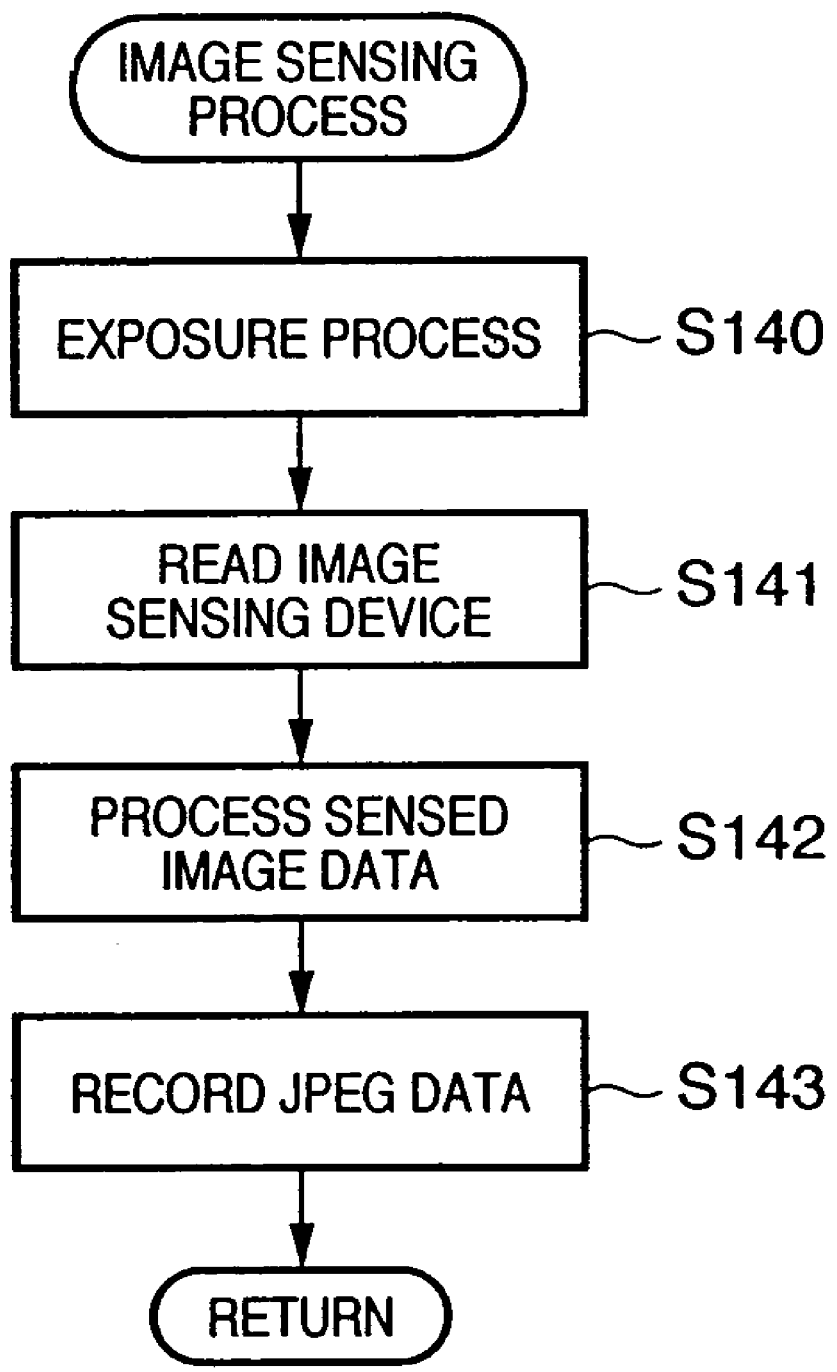
FIG. 5 is a flowchart of an image sensing process according to the first embodiment of the present invention.

FIG. 5 is a flowchart showing in detail the image sensing process performed in step S104.

In step S140, the system controller 50 drives the shutter 12 through the exposure controller 40 to execute an exposure process of performing exposure for an appropriate period of time. After the exposure for the appropriate period of time, the system controller 50 performs an image sensing device read process (step S141). This process reads sensed image data into the RAW data region of the memory 34 through the image sensing device 14, A/D converter 16, image processor 20, and memory controller 22 or through the A/D converter 16 and memory controller 22. An image process performed in the image processor 20 includes minimum processes such as a pixel squaring process of performing interpolation so as to set the pixel aspect ratio of the image sensing device 14 to 1:1. The read image data from the image sensing device 14 is stored in the RAW data region of the memory 34 without any degradation.

Assume that the JPEG format is designated as the recording format. After the image sensing device read process, the system controller 50 reads out the image written in the RAW data region of the memory 34. The system controller 50 executes a sensed image data process (step S142) of performing various image processes using the memory controller 22 and optionally the image processor 20, and performing an image compression process in accordance with a set mode using a compression/expansion circuit 36.

Then, the system controller 50 executes a JPEG data recording process (step S143) of writing JPEG image data created by the sensed image data process in a recording medium 200 or 210 such as a memory card, compact flash© card, or the like through an I/F 90 or 94 and connector 92 or 96. Then, the system controller 50 ends the image sensing process. Note that the recording format to be used is not limited to JPEG, and an arbitrary format may be used.

After the image sensing process in step S104 of FIG. 2 ends as described above, the system controller 50 performs a review display process (review display mode) of displaying the sensed image data as a review image in the following cases (step S106). The process is performed if the system controller 50 is arranged in advance to perform review display after image sensing process or if a predetermined operation member of an operation unit 70 is operated to perform review display (YES in step S105). Otherwise, the flow advances to step S110.

Figure 6:
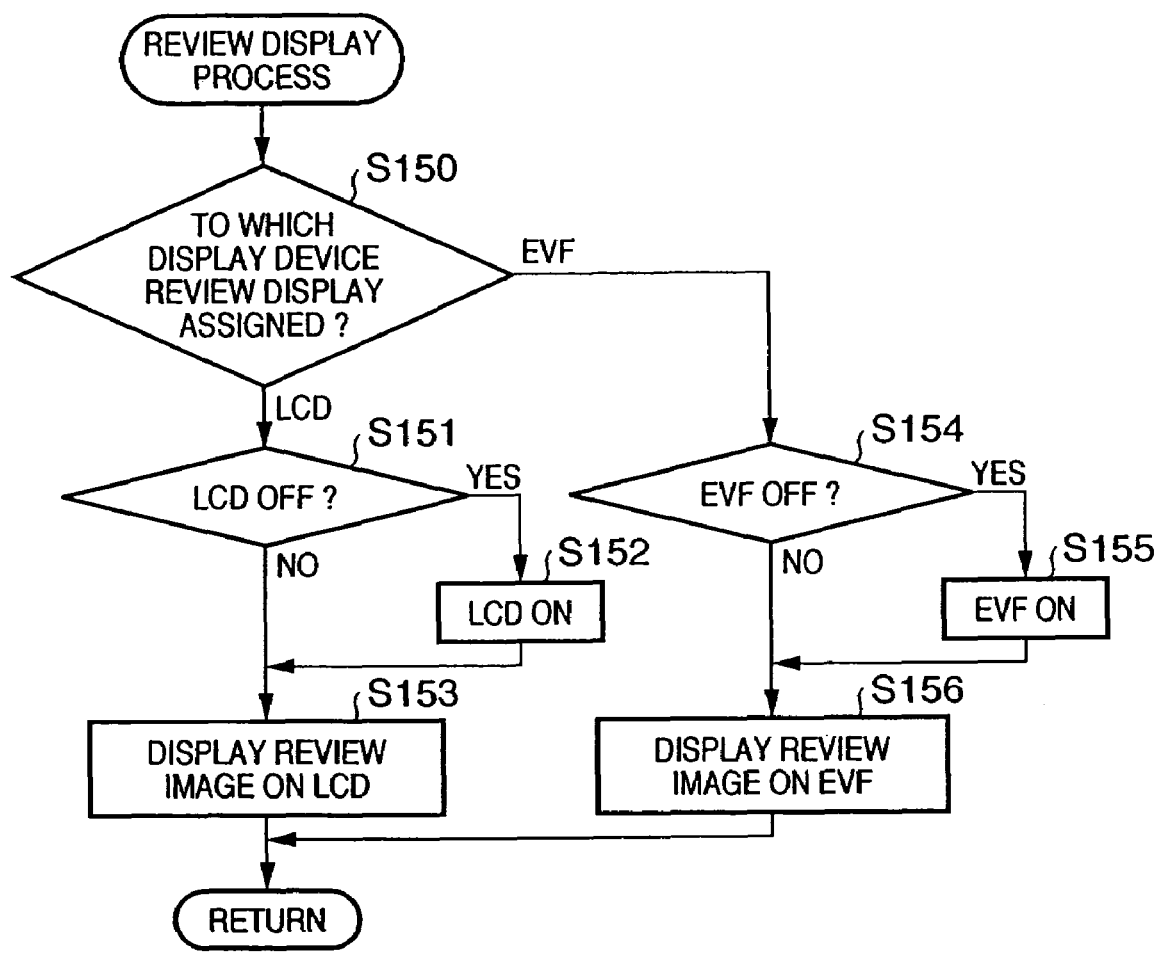
FIG. 6 is a flowchart of a review display process according to the first embodiment of the present invention.

FIG. 6 is a flowchart showing in detail the review display process performed in step S106. In step S150, it is determined to which display device review display is currently assigned. If the LCD is assigned, the flow advances to step S151. If the LCD 28 is in the OFF state, the flow advances to step S152 to turn on the LCD 28. Then, the sensed image data is displayed on the LCD 28 as the review image (step S153).

On the other hand, if it is determined in the step S150 that the review display is assigned to the EVF, the flow advances to step S154. If the EVF 32 is in the OFF state, the flow advances to step S155 to turn on the EVF 32. The sensed image data is displayed on the EVF 32 as the review image (step S156). After the review image display in step S153 or S156, the flow returns to FIG. 2.

In the step S107, it is determined whether the display device changeover switch 66 is operated during the review display. If NO in step S107, the flow advances to step S109; otherwise, the flow advances to step S108 to perform a review display device changeover process by the system controller 50.

Figure 7:
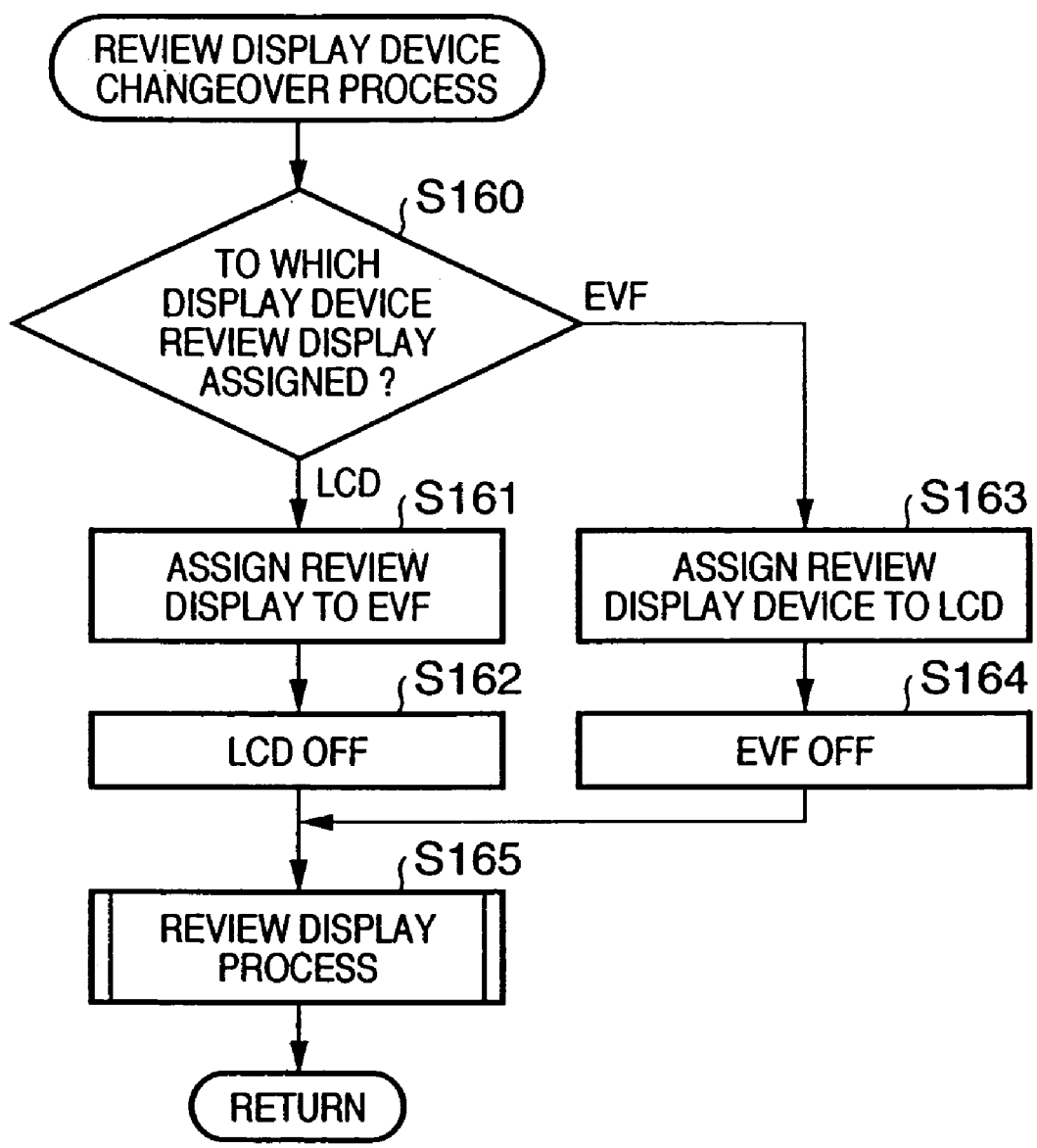
FIG. 7 is a flowchart of a review display device changeover process according to the first embodiment of the present invention.

FIG. 7 is a flowchart showing in detail the review display device changeover process performed in step S107.

In step S160, it is determined to which display device the review display is currently assigned. If the LCD is assigned, the flow advances to step S161 to change the assignment to the EVF. In step S162, the LCD 28 is turned off, and the flow advances to step S165.

On the other hand, if it is determined in step S160 that the review display is assigned to the EVF, the flow advances to step S163 to change the assignment to the LCD. In step S164, the EVF 32 is turned off, and the flow advances to step S165. In step S165, the review display process described with reference to FIG. 6 is performed. After the process, the flow returns to FIG. 2. It should be noted that the processes in steps S162 and S164 need not be performed at the above-mentioned timings. For example, the processes may be performed after the review display process or may not be performed.

This operation of the display device changeover switch 66 during review display makes it possible to easily select, set, and store a display device for review display. The selected result of the display device for review display is stored in the internal memory of the system controller 50, the memory 52, or the nonvolatile memory 56.

In step S109 of FIG. 2, the system controller 50 determines whether to end review display. More specifically, the system controller 50 determines whether a predetermined period of time has elapsed or whether review display is designated to end by the operation of the shutter switch 62 or 64, operation unit 70, or the like. If the system controller 50 determines to continue review display, the flow returns to step S107; otherwise, the flow advances to step S110.

In step S110, unless the mode dial 60 or operation unit 70 is operated to give an image sensing mode end instruction, the flow returns to step S100, and the system controller 50 continues operation in the image sensing mode.

The image sensing apparatus 100 completes a sequence of operations for the image sensing mode in the above-mentioned manner.

Next, display device changeover operation in the playback mode of the image sensing apparatus 100 according to the first embodiment will be described with reference to the flowcharts in FIGS. 8 to 10.

When the playback mode is selected using the mode dial 60, the image sensing apparatus 100 starts operation in the playback mode. In step S200, the system controller 50 starts a playback process (playback mode) of displaying image data recorded on the recording medium 200 or 210, as shown in FIG. 8.

Figure 8:
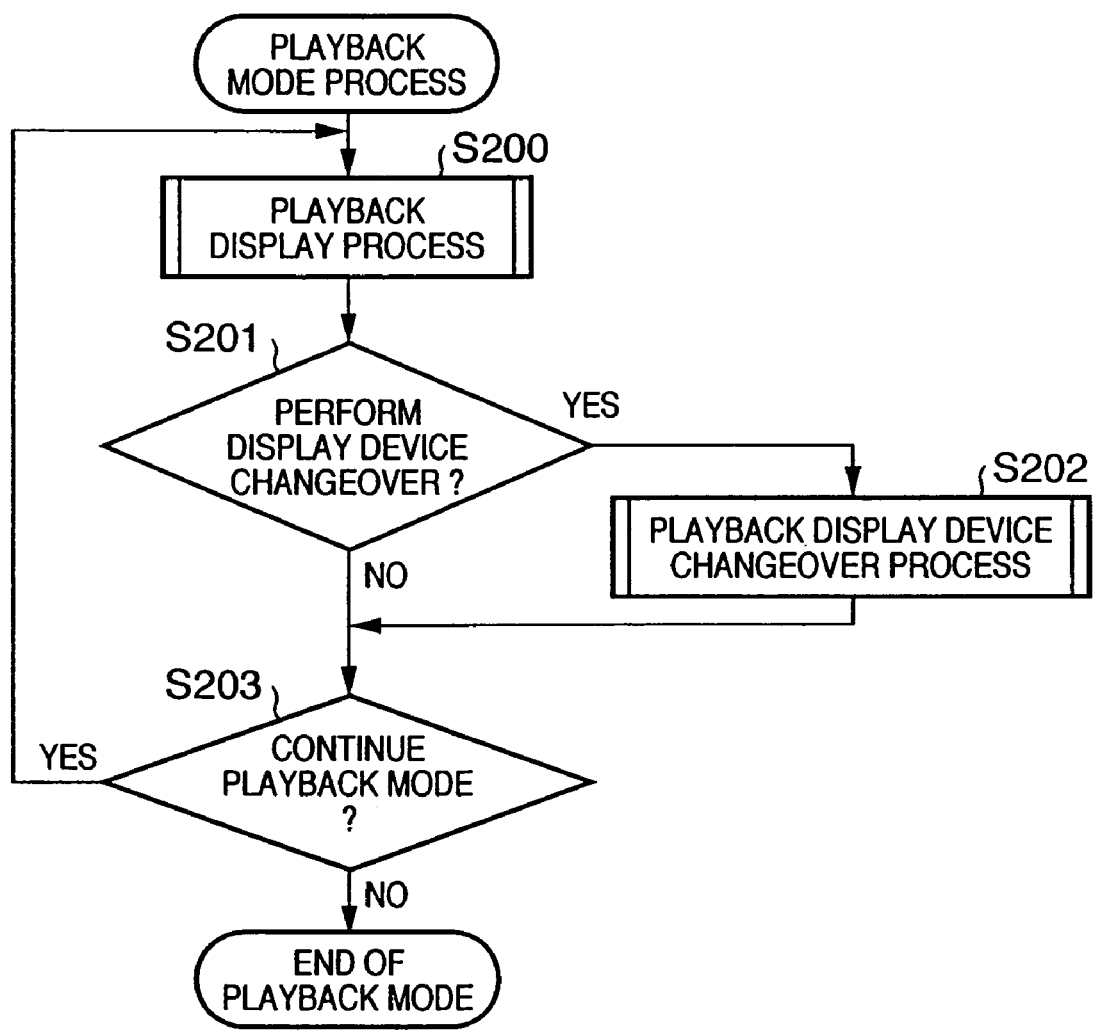
FIG. 8 is a flowchart showing a process in a playback mode according to the first embodiment of the present invention.
Figure 9:
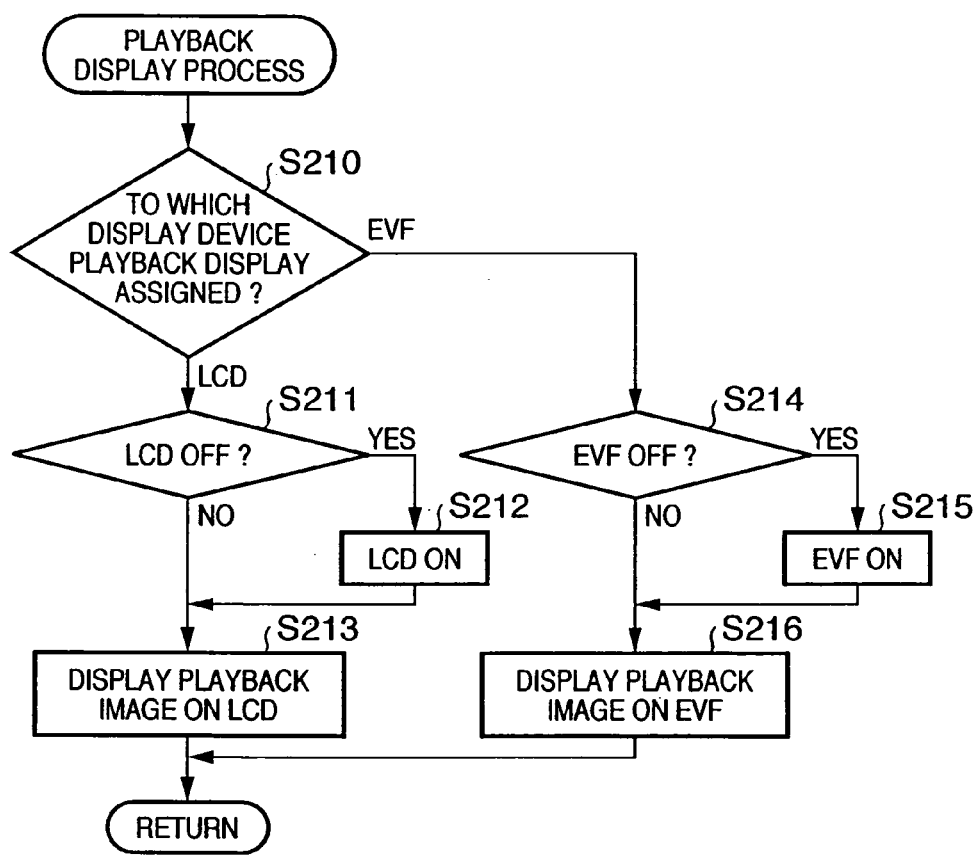
FIG. 9 is a flowchart of a playback process according to the first embodiment of the present invention.

FIG. 9 is a flowchart showing in detail the playback process performed in step S200 of FIG. 8.

In step S210, it is determined to which display device playback display is assigned. If the LCD is assigned, the flow advances to step S211. If the LCD 28 is in the OFF state, the flow advances to step S212 to turn on the LCD 28. Then, the sensed image stored in the recording medium 200 or 210 is played back on the LCD 28 (step S213).

On the other hand, if it is determined in step S210 that the playback display is assigned to the EVF, the flow advances to step S214. If the EVF 32 is in the OFF state, the flow advances to step S215 to turn on the EVF 32. Then, the sensed image recorded on the recording medium 200 or 210 is played back on the EVF 32 (step S216). After the playback in step S213 or S216, the flow returns to FIG. 8.

In step S201 of FIG. 8, it is determined whether the display device changeover switch 66 is operated during the playback. If NO in step S201, the flow advances to step S203; otherwise, the flow advances to step S202 to perform a playback device changeover process.

Figure 10:
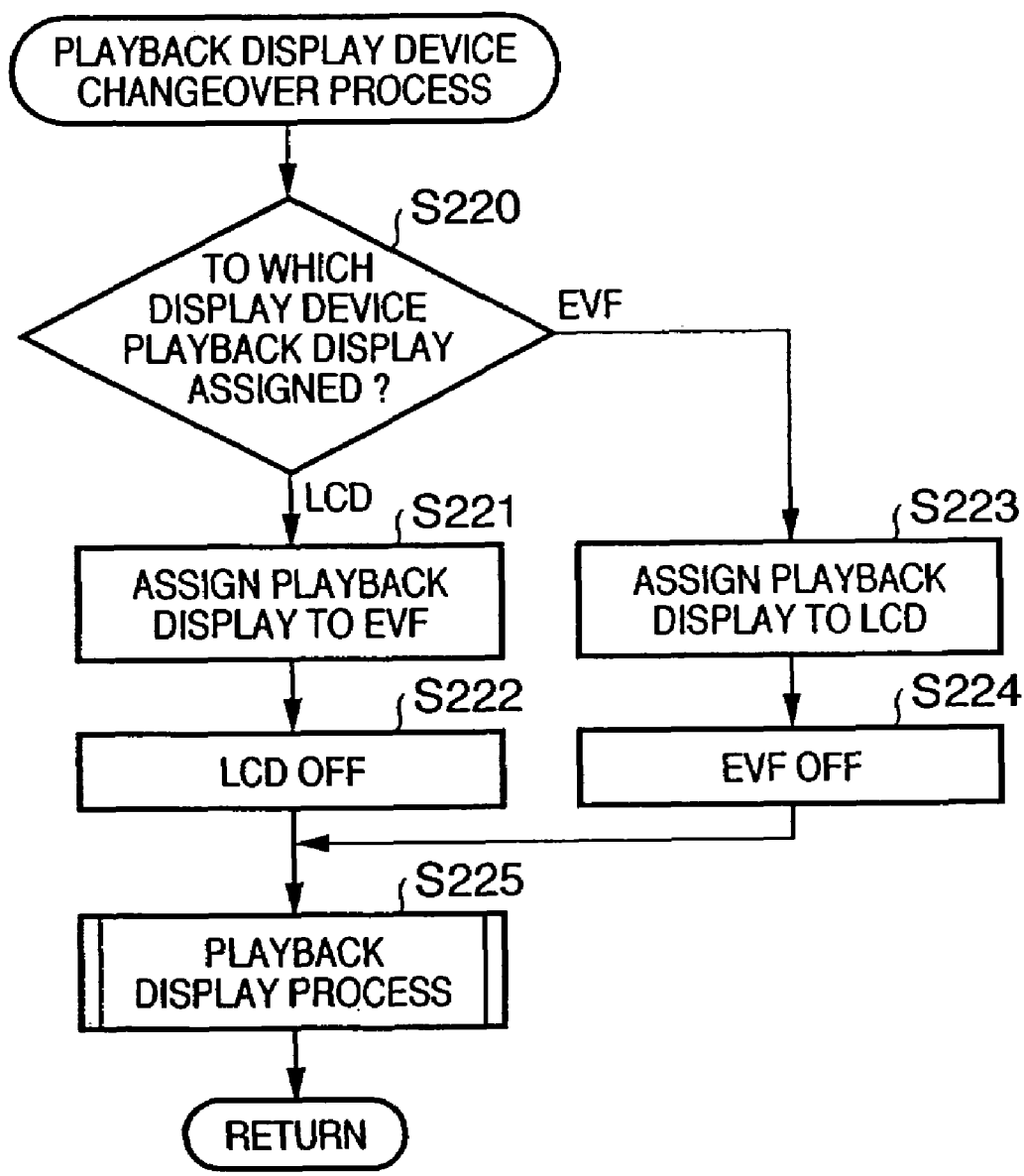
FIG. 10 is a flowchart of a playback device changeover process according to the first embodiment of the present invention.

FIG. 10 is a flowchart showing in detail the playback device changeover process in step S202 of FIG. 8.

In step S220, it is determined to which display device the playback display is currently assigned. If the LCD is assigned, the flow advances to step S221 to change the assignment of the playback display to the EVF. In step S222, the LCD 28 is turned off, and the flow advances to step S225.

On the other hand, if it is determined in step S220 that the playback display is assigned to the EVF, the flow advances to step S223 to change the assignment to the LCD. In step S224, the EVF 32 is turned off, and the flow advances to step S225. In step S225, the playback process described with reference to FIG. 9 is performed. After the process, the flow returns to FIG. 8. It should be noted that the processes in steps S222 and S224 need not be performed at the above-mentioned timings. For example, the processes may be performed after the playback process or may not be performed.

This operation of the display device changeover switch 66 during playback makes it possible to easily select, set, and store a display device to be used for playback. The selected result of the display device for playback is stored in the internal memory of the system controller 50, the memory 52, or the nonvolatile memory 56.

In step S203 of FIG. 8, unless the mode dial 60 or operation unit 70 is operated to give a playback mode end instruction, the flow returns to step S200, and the system controller 50 continues operation in the playback mode.

The image sensing apparatus 100 completes a sequence of operations for the playback mode in the above-mentioned manner.

As described above, the first embodiment makes it possible to easily change over a display device to be used in each display mode between display devices and set a succeeding one as the display device to be used. Also, in changeover between display modes, the display device to be used can automatically be changed over in accordance with a succeeding display mode to display an image.

Figure 11:
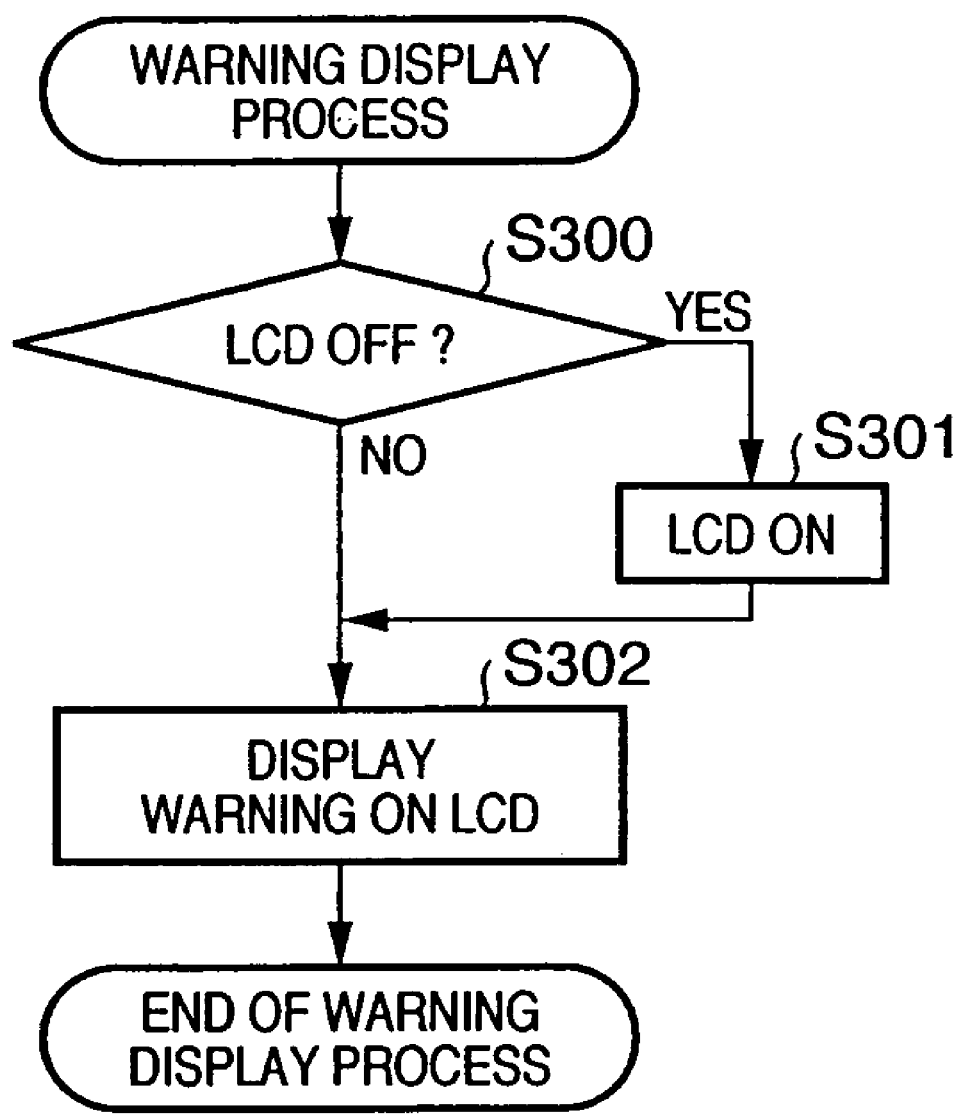
FIG. 11 is a flowchart of a warning display process according to the first embodiment of the present invention.

FIG. 11 shows a flowchart of warning display operation of the image sensing apparatus 100 according to the first embodiment.

Assume that a problem which requires a warning to the user occurs in the image sensing apparatus 100. If the LCD 28 is in the OFF state (YES in step S300), in step S301, the system controller 50 turns on the LCD 28 and displays a warning message on the LCD 28 (step S302).

Figure 12:
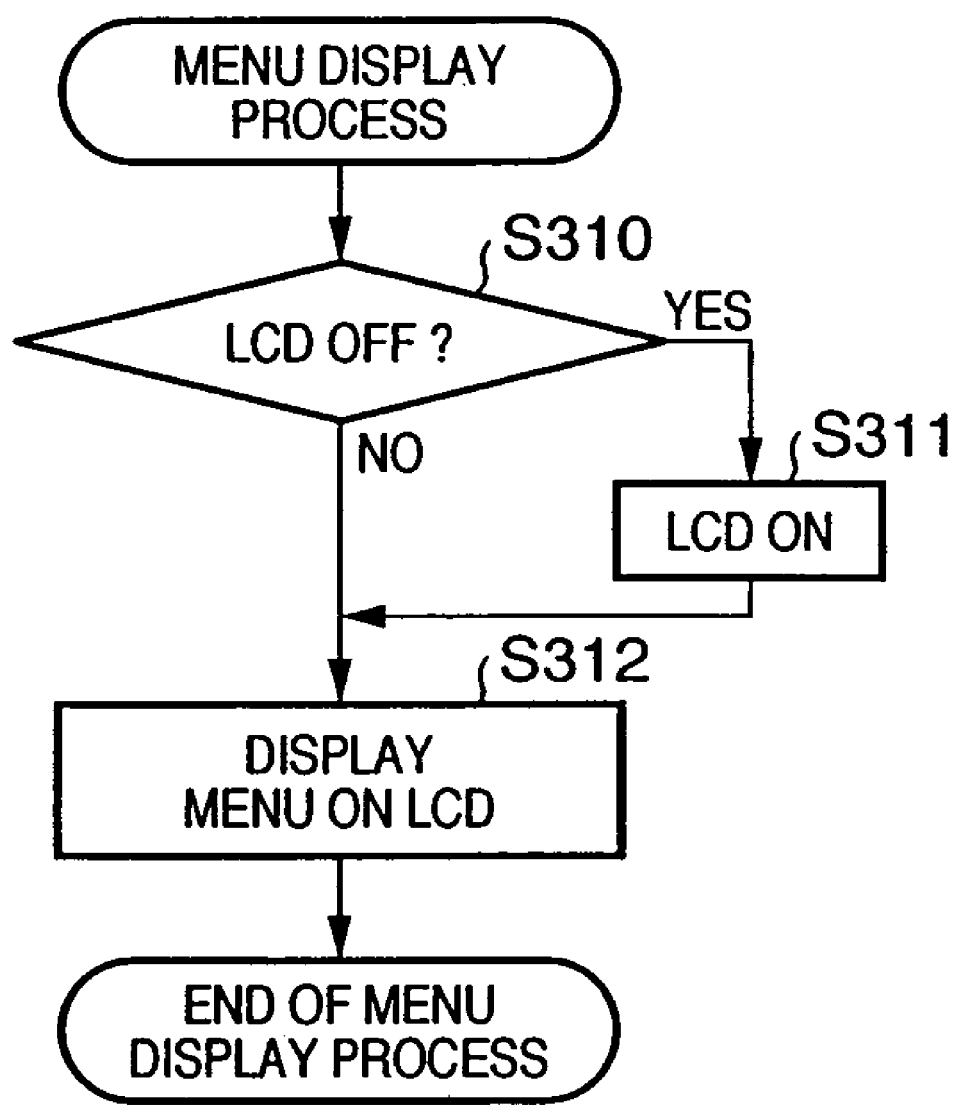
FIG. 12 is a flowchart of a setup menu display process according to the first embodiment of the present invention.

FIG. 12 shows a flowchart of setup menu display operation of the image sensing apparatus 100 according to the first embodiment.

Assume that a menu button of the operation unit 70 is operated to give a menu display instruction in the image sensing apparatus 100. If the LCD 28 is in the OFF state (YES in step S310), in step S311, the system controller 50 turns on the LCD 28 and displays a setup menu on the LCD 28 (step S312).

To display a warning message or a setup menu to make various settings for the image sensing apparatus 100, an LCD which is outwardly most visible is used, regardless of the assignment of a display device for each display mode. This makes it possible to display a warning message in an at-a-glance manner and comfortably perform setting operation of the image sensing apparatus 100.

Second Embodiment

The second embodiment of the present invention will be described next.

Figure 13:
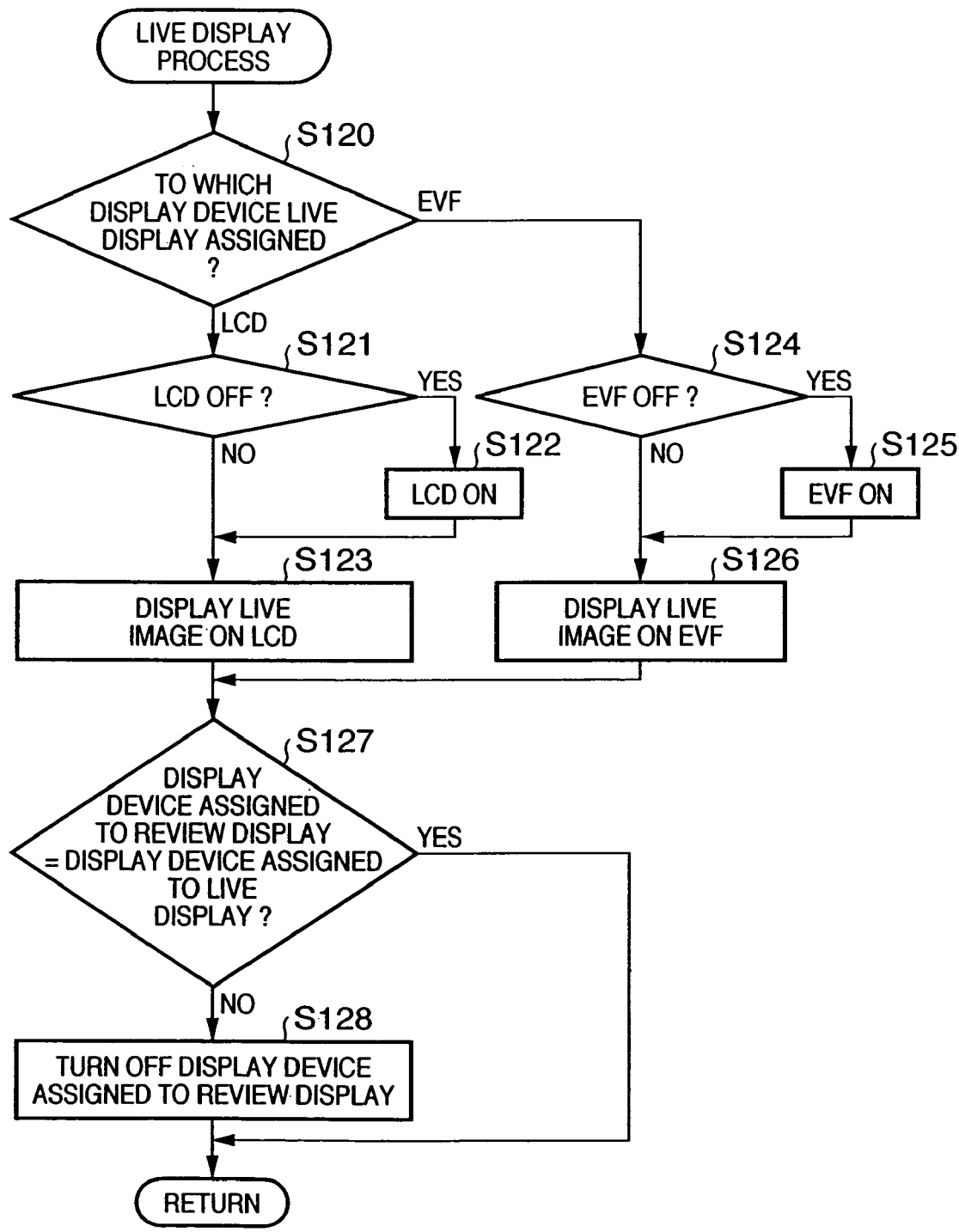
FIG. 13 is a flowchart of a live display process according to a second embodiment of the present invention.

In the second embodiment, if different display devices are assigned as the display devices for the live display mode and review display mode, the one to go out of use is turned off in changeover between the modes. FIG. 13 is a flowchart of a live display process and FIG. 14, a flowchart of a review display process according to the second embodiment. The processes shown in FIGS. 13 and 14 substitute for the processes shown in FIGS. 3 and 6 in the first embodiment. The remaining processes are the same as those in the first embodiment, and a description thereof will be omitted.

The live display process according to the second embodiment will be described with reference to FIG. 13.

The processes in steps S120 to S126 are similar to those in FIG. 3 which are described in the first embodiment and are denoted by the same step numbers, and a description thereof will be omitted. In step S127, the system controller 50 determines whether the display device assigned to the review display and the display device assigned to the live display are the same. If NO in step S127, the flow advances to step S128 to turn off the display device assigned to the review display, then returns to the process in FIG. 2. Otherwise, the flow directly returns from step S127 to the process in FIG. 2.

The review display process according to the second embodiment will be described with reference to FIG. 14.

The processes in steps S150 to S156 are similar to those in FIG. 6 which are described in the first embodiment and are denoted by the same step numbers, and a description thereof will be omitted. In step S157, the system controller 50 determines whether the display device assigned to the live display and the display device assigned to the review display are the same. If NO in step S157, the flow advances to step S158 to turn off the display device assigned to the live display, then returns to the process in FIG. 2. Otherwise, the flow directly returns from step S157 to FIG. 2.

According to the second embodiment as described above, if the display device assigned to the live display and the display device assigned to the review display are different, and one of the display devices is in use, the other is turned off to suppress power consumption. This can prolong the battery life of an image sensing apparatus 100.

Third Embodiment

The third embodiment of the present invention will be described.

Figure 15:
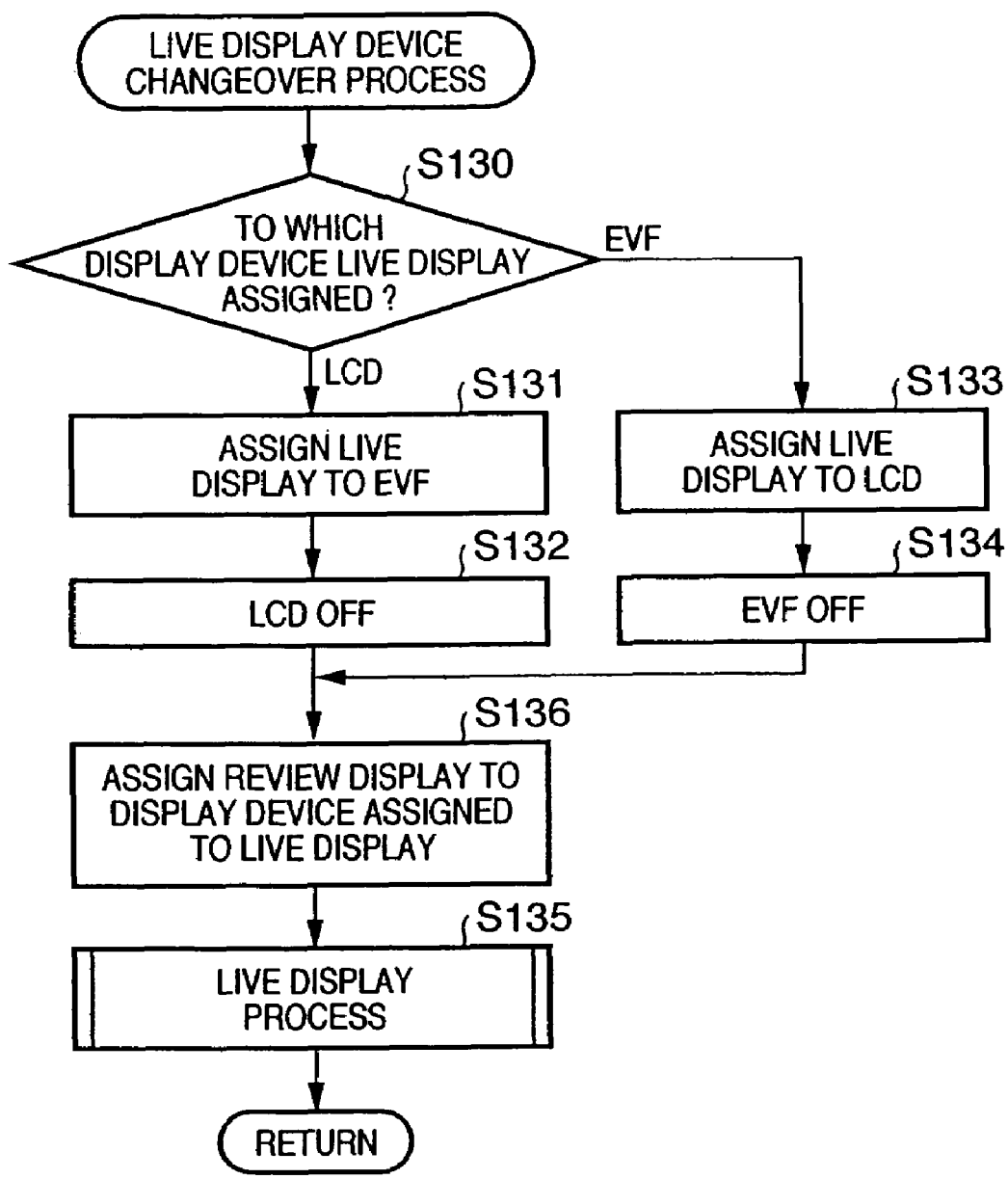
FIG. 15 is a flowchart of a live display device changeover process according to a third embodiment of the present invention.
Figure 16:
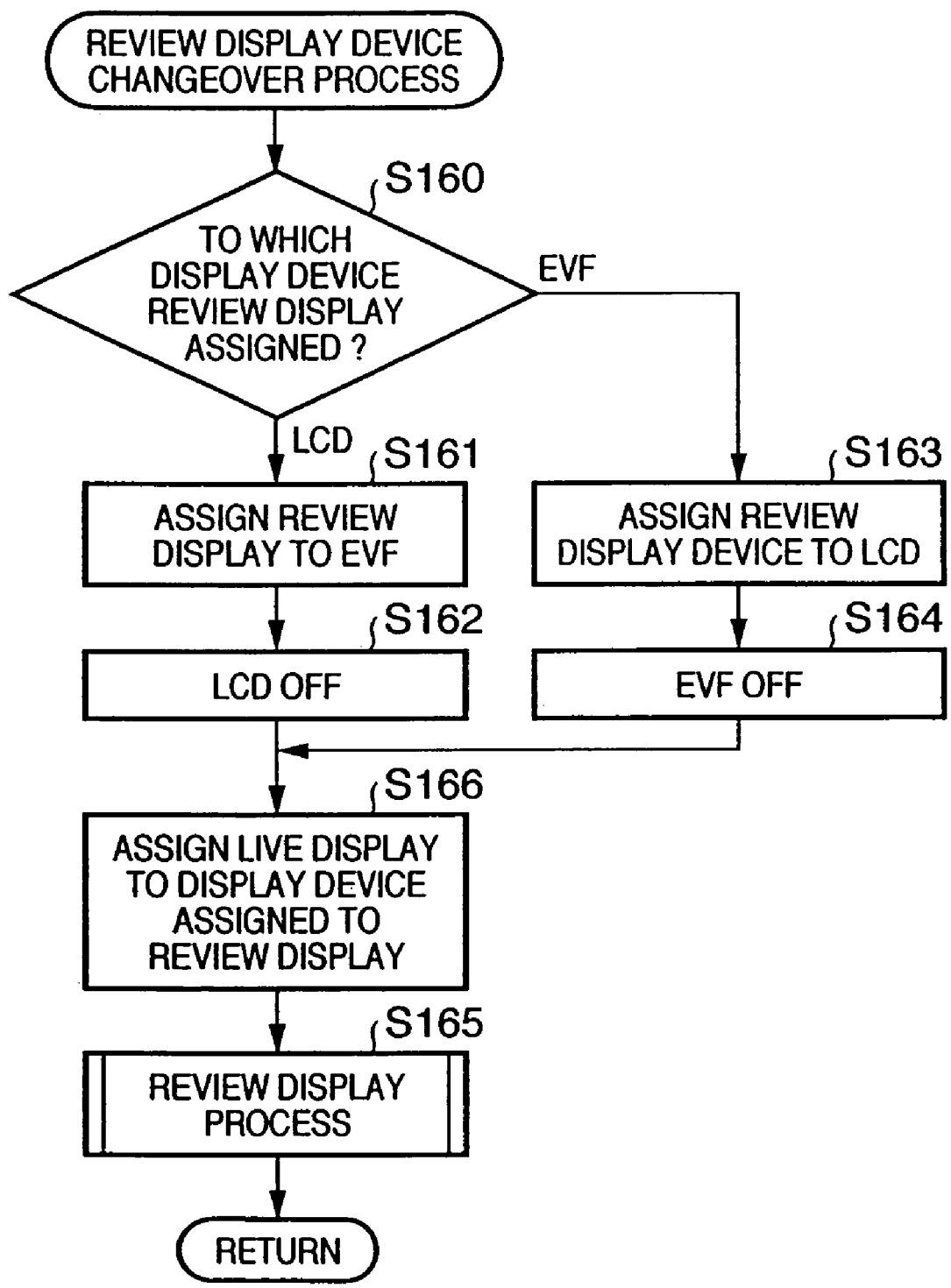
FIG. 16 is a flowchart of a review display device changeover process according to the third embodiment of the present invention.

In the third embodiment, if assignment to one of live display and review display is changed from one display device to another, assignment of the other display is automatically changed in the same way. FIG. 15 is a flowchart of a live display device changeover process, and FIG. 16 is a flowchart of a review display device changeover process according to the third embodiment. The processes shown in FIGS. 15 and 16 substitute for the processes shown in FIGS. 4 and 7 in the first embodiment. The remaining processes are the same as those in the first embodiment, and a description thereof will be omitted.

The live display device changeover process according to the third embodiment will be described with reference to FIG. 15.

The processes in steps S130 to S134 are similar to those in FIG. 4 which are described in the first embodiment and are denoted by the same step numbers, and a description thereof will be omitted. In step S136, the system controller 50 changes the assignment so that both review display and live display are assigned to the same display. More specifically, if the assignment of live display is changed to EVF in step S131, then the assignment of review display is also changed to EVF in step S136. Similarly, if the assignment to live display is changed to LCD in step S133, then the assignment of review display is also changed to LCD in step S136.

Then, in step S135, the live display process shown in FIG. 3 is performed, and the flow returns to FIG. 2.

Next, the review display device changeover process according to the third embodiment will be described with reference to FIG. 16.

The processes in steps S160 to S164 are similar to those in FIG. 7 which are described in the first embodiment and are denoted by the same step numbers, and a description thereof will be omitted. In step S166, the system controller 50 changes the assignment so that both live display and review display are assigned to the same display device. More specifically, if the assignment to review display is changed to EVF in step S161, then the assignment to live display is also changed to EVF in step S166. Similarly, if the assignment to review display is changed to LCD in step S163, then the assignment to live display is also changed to LCD in step S166.

Then, in step S165, the review display process shown in FIG. 6 is performed, and the flow returns to FIG. 2.

As described above, when the assignment of one of the live display and review display is changed from one display device to another, the assignment of the other display is automatically changed in the same way. This makes it possible to change over the assignment of the live display and review display at once.

Fourth Embodiment

The fourth embodiment of the present invention will be described.

Figure 17:
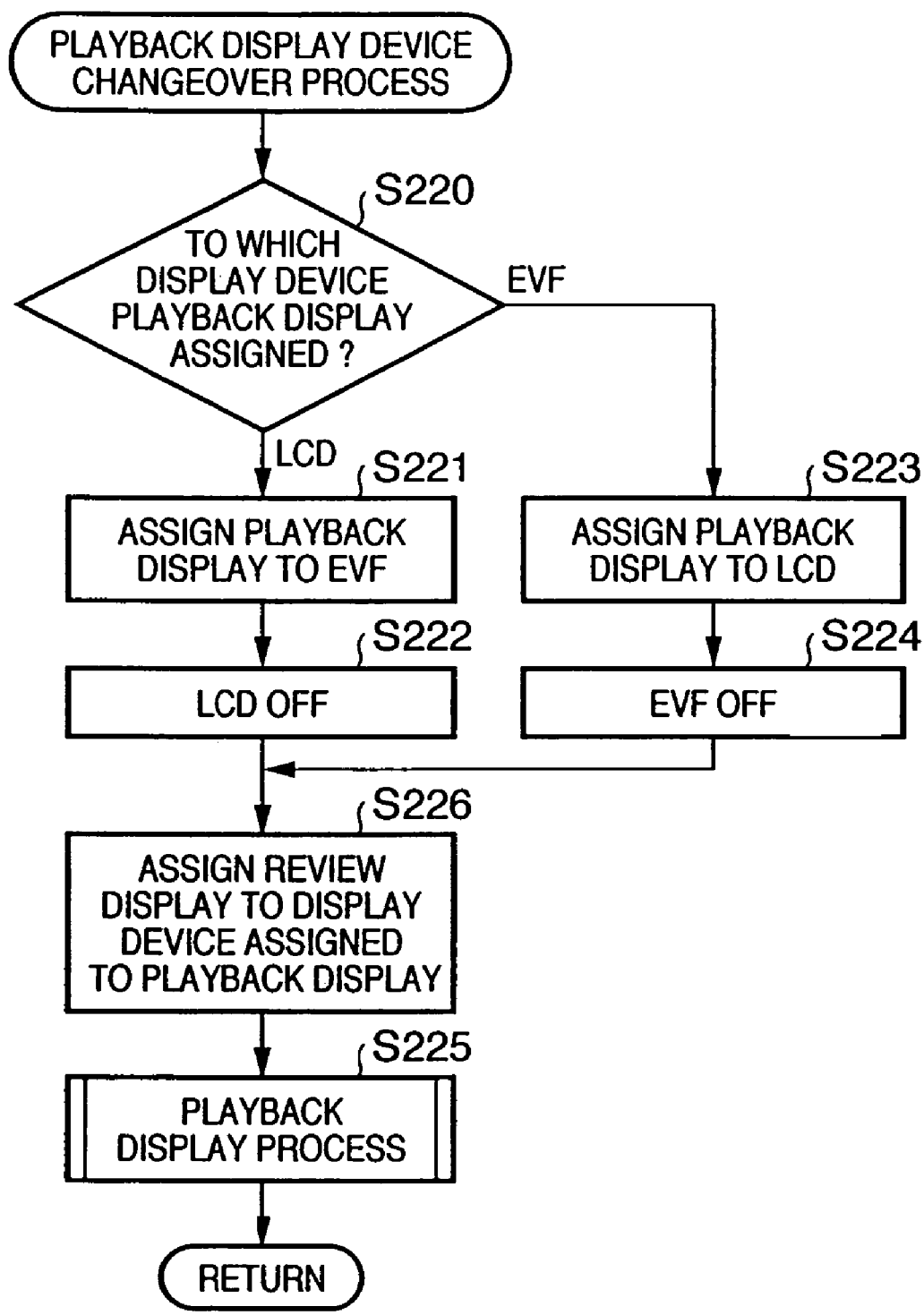
FIG. 17 is a flowchart of a playback device changeover process according to a fourth embodiment of the present invention.
Figure 18:
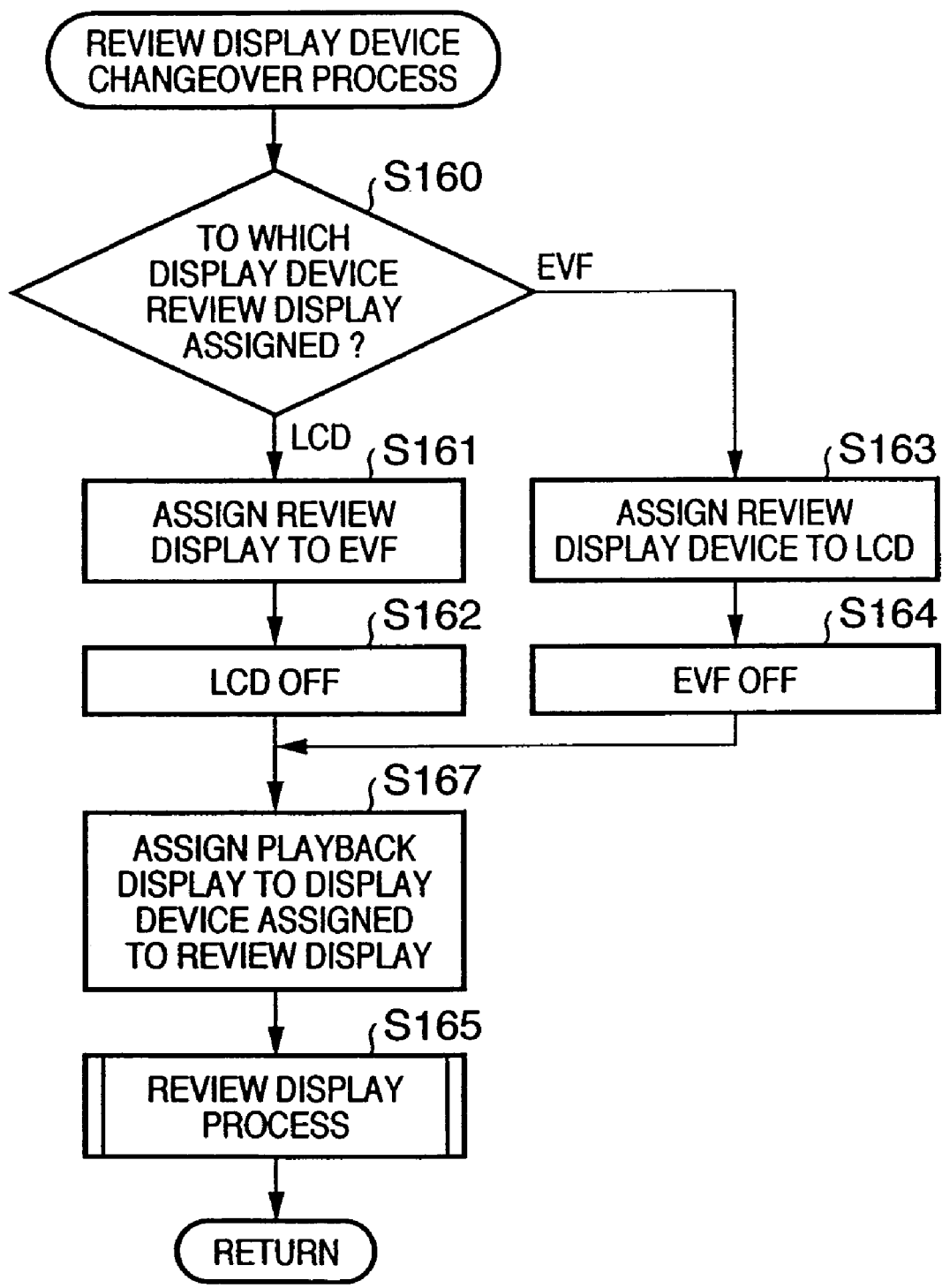
FIG. 18 is a flowchart of a review display device changeover process according to the fourth embodiment of the present invention.

In the fourth embodiment, if assignment of one of playback display and review display is changed from one display device to another, assignment of the other display is automatically changed in the same way. FIG. 17 is a flowchart of a playback device changeover process, and FIG. 18 is a flowchart of a review display device changeover process according to the fourth embodiment. The processes shown in FIGS. 17 and 18 substitute for the processes shown in FIGS. 10 and 7 in the first embodiment. The remaining processes are the same as those in the first embodiment, and a description thereof will be omitted.

The playback device changeover process according to the fourth embodiment will be described with reference to FIG. 17.

The processes in steps S220 to S224 are similar to those in FIG. 10 which are described in the first embodiment and are denoted by the same step numbers, and a description thereof will be omitted. In step S226, the system controller 50 changes the assignment so that both review display and playback display are assigned to the same display device. More specifically, if the assignment of playback display is changed to EVF in step S221, then the assignment of review display is also changed to EVF in step S226. If the assignment of playback display is changed to LCD in step S223, then the assignment to review display is also changed to LCD in step S226.

Then, in step S225, the playback process shown in FIG. 9 is performed, and the flow returns to FIG. 8.

The review display device changeover process according to the fourth embodiment will be described with reference to FIG. 18.

The processes in steps S160 to S164 are similar to those in FIG. 7 which are described in the first embodiment and are denoted by the same step numbers, and a description thereof will be omitted. In step S167, the system controller 50 changes the assignment so that both review display and playback display are assigned to the same display device. More specifically, if the assignment of review display is changed to EVF in step S161, then the assignment of playback display is also changed to EVF in step S167. Similarly, if the assignment of review display is changed to LCD in step S163, the assignment of playback display is also changed to LCD in step S167.

Figure 14:
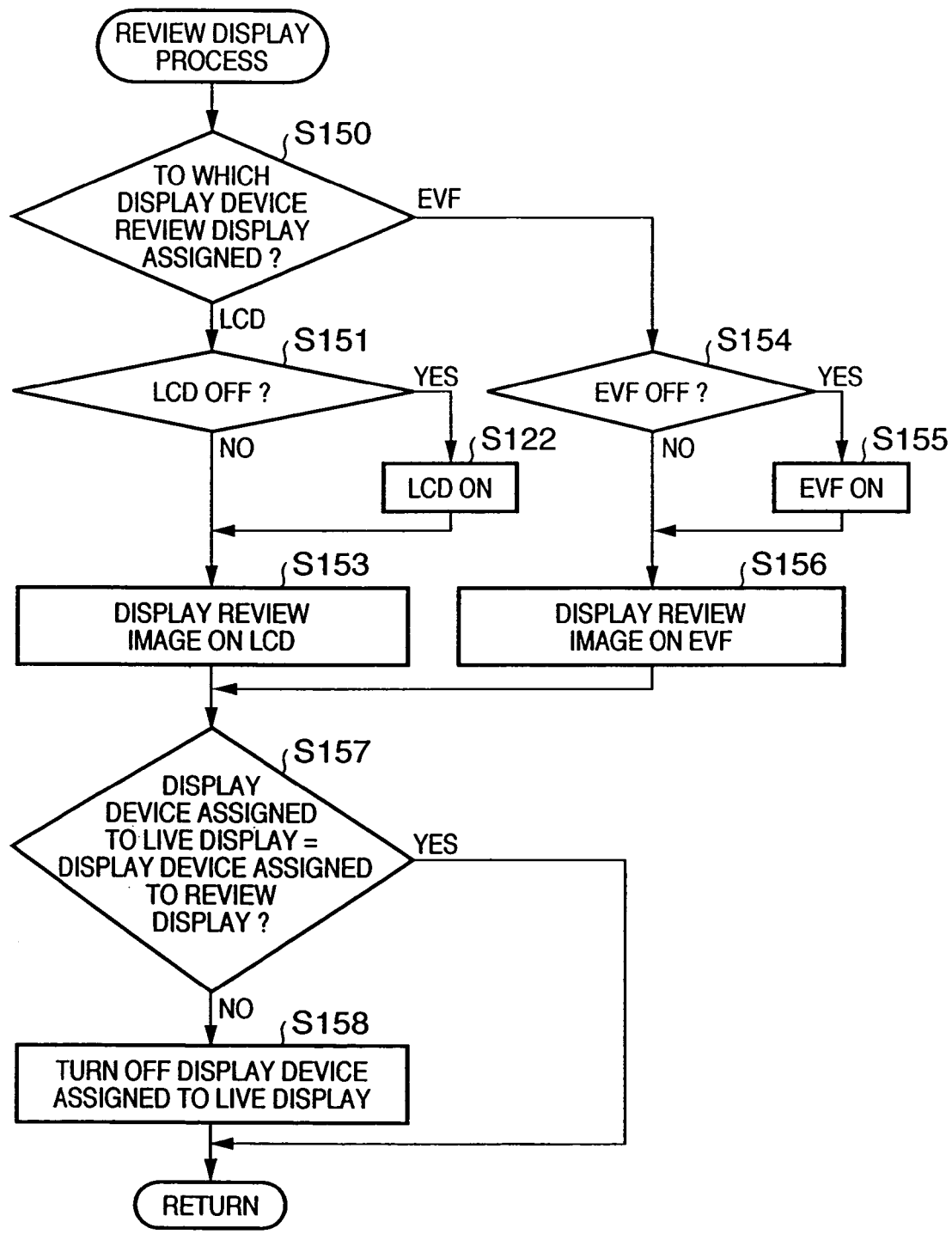
FIG. 14 is a flowchart of a review display process according to the second embodiment of the present invention.

Then, in step S165, the review display process shown in FIG. 6 or 14 is performed, and the flow returns to FIG. 2.

As described above, when the assignment of one of the playback display and review display is changed from one display device to another, the assignment of the other display is automatically changed in the same way. This makes it possible to change over the assignment of the playback display and review display at once.

In the third and fourth embodiments, it is explained that when assignment of one of playback display and review display is changed from one display device to another, assignment of the other display is automatically changed in the same way. Alternatively, it is possible to change the assignment of the other display so that the respective displays are assigned to different display devices.

Also, the apparatus can be arranged such that the user can determine to which display device the other display is assigned.

Additionally, the apparatus can be arranged such that the user can determine whether to automatically change the assignment of a display device to the other display.

Fifth Embodiment

The fifth embodiment of the present invention will be described.

The fifth embodiment will describe a display control process in which an LCD 28 is attached to an image sensing apparatus 100 as an openable panel.

An LCD check process to be performed when the image sensing apparatus 100 is powered on according to the fifth embodiment will be described with reference to FIG. 19.

When the image sensing apparatus 100 is powered on, it is determined in step S400 whether the LCD 28 is open. If YES in step S400, the process ends. If NO in step S400, EVF is assigned to live display, review display, and playback display in steps S401, S402, and S403, respectively. In step S404, a display device changeover switch 66 is disabled, and the process ends.

Thus, when the LCD 28 is kept closed, the above-mentioned process makes an EVF perform all display operations.

Figure 19:
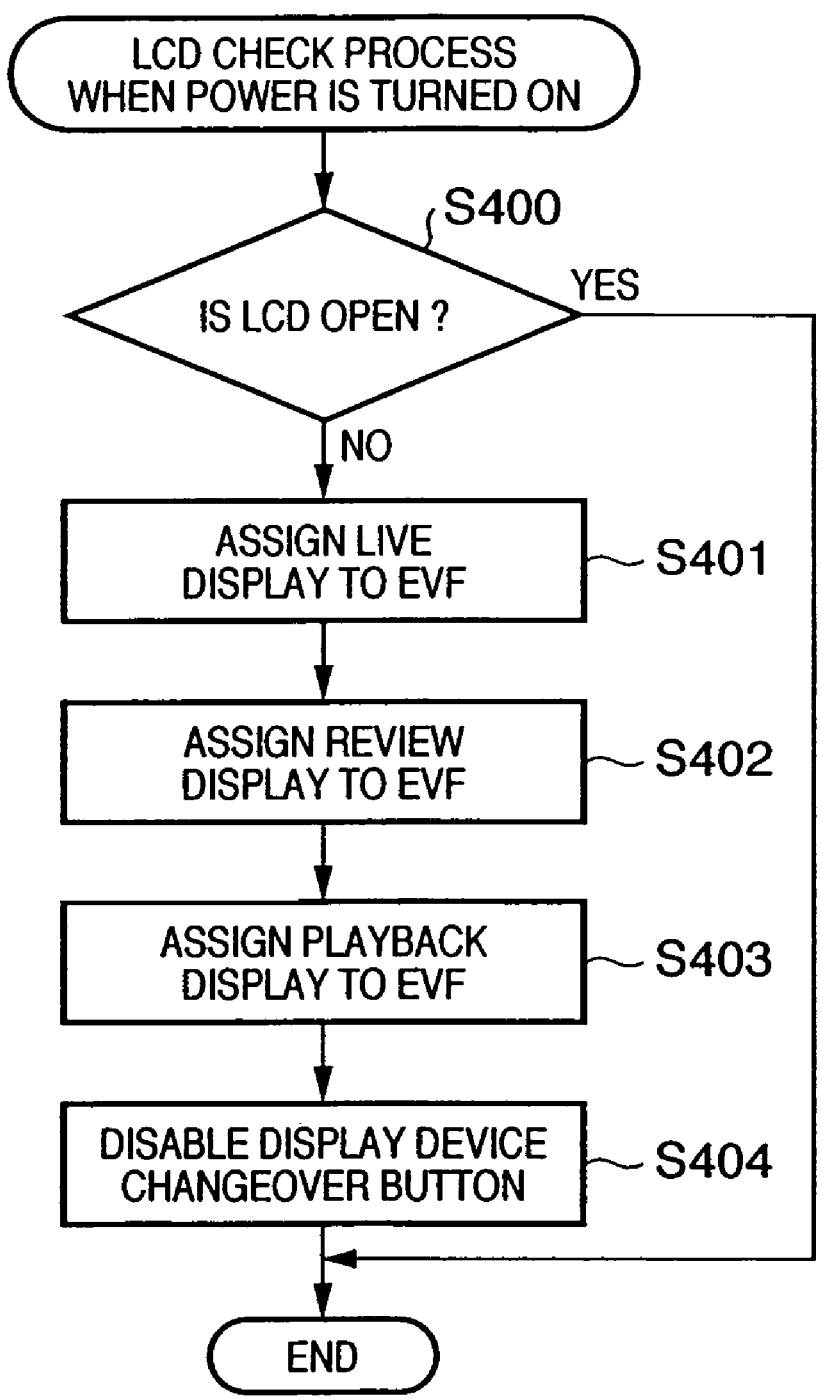
FIG. 19 is a flowchart of an LCD check process when a power is turned on according to a fifth embodiment of the present invention.

With the process in FIG. 19, when the LCD 28 is kept closed, the EVF performs image display in each of the display processes in steps S100 and S106 and step S200 in FIG. 8, and the display device changeover switch 66 is disabled. Also, negative determinations are always made in steps S101 and S107 in FIG. 2 and step S201 in FIG. 8, and display device changeover operation is disabled. The example in FIG. 19 has described a case wherein the process ends when the LCD 28 is open. The process may be ended after assigning LCD to the respective displays on the basis of a determination that the user wants to display an image on the LCD 28.

A process to be performed when the LCD 28 is opened according to the fifth embodiment will be described with reference to FIG. 20.

If it is determined by a sensor (not shown) that the LCD 28 is opened, the LCD is assigned to live display, review display, and playback display in steps S410, S411, and S412, respectively. In step S413, the display device changeover switch 66 is enabled, and the process ends. In the above-mentioned example where the LCD 28 is opened, the operations in steps S410 to S412 are performed on the basis of a determination that the user wants to display an image on the LCD 28. The operations in steps S410 to S412, however, may not be performed. Alternatively, the apparatus may be arranged such that the user can assign the display devices to meet his/her preferences.

Figure 20:
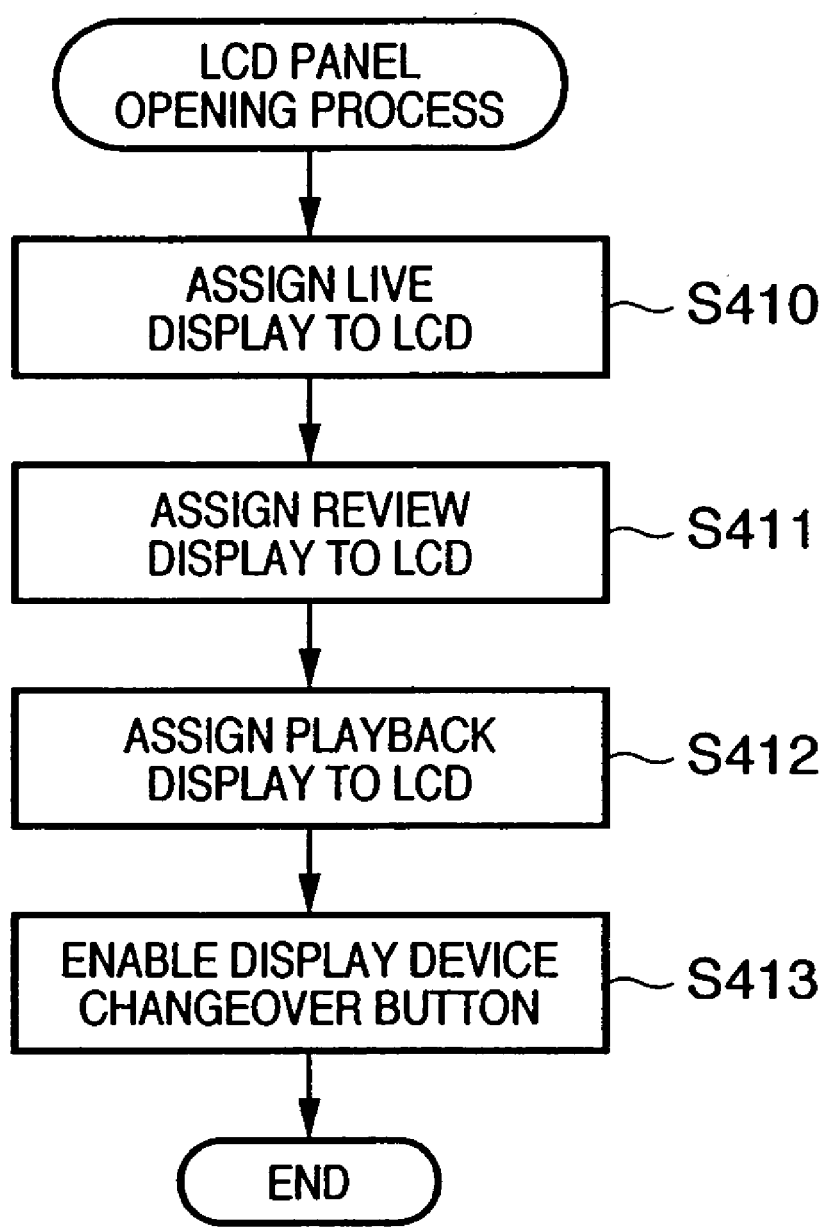
FIG. 20 is a flowchart of an LCD panel closing process according to the fifth embodiment of the present invention.

With the process in FIG. 20, when the LCD 28 is opened during live display, review display, or playback display, a corresponding one of the display devices assigned in the process in FIG. 20 displays an image in each of the display processes in steps S100 and S106 and step S200 in FIG. 8, and the display device changeover switch 66 is enabled. Hence, the display device changeover operation is enabled.

A process to be performed when the LCD 28 is closed according to the fifth embodiment will be described with reference to FIG. 21.

If it is determined by the sensor (not shown) that the LCD 28 is closed, EVF is assigned to live display device, review display, and playback display in steps S420, S421, and S422, respectively. In step S423, the display device changeover switch 66 is disabled, and the process ends.

Figure 21:
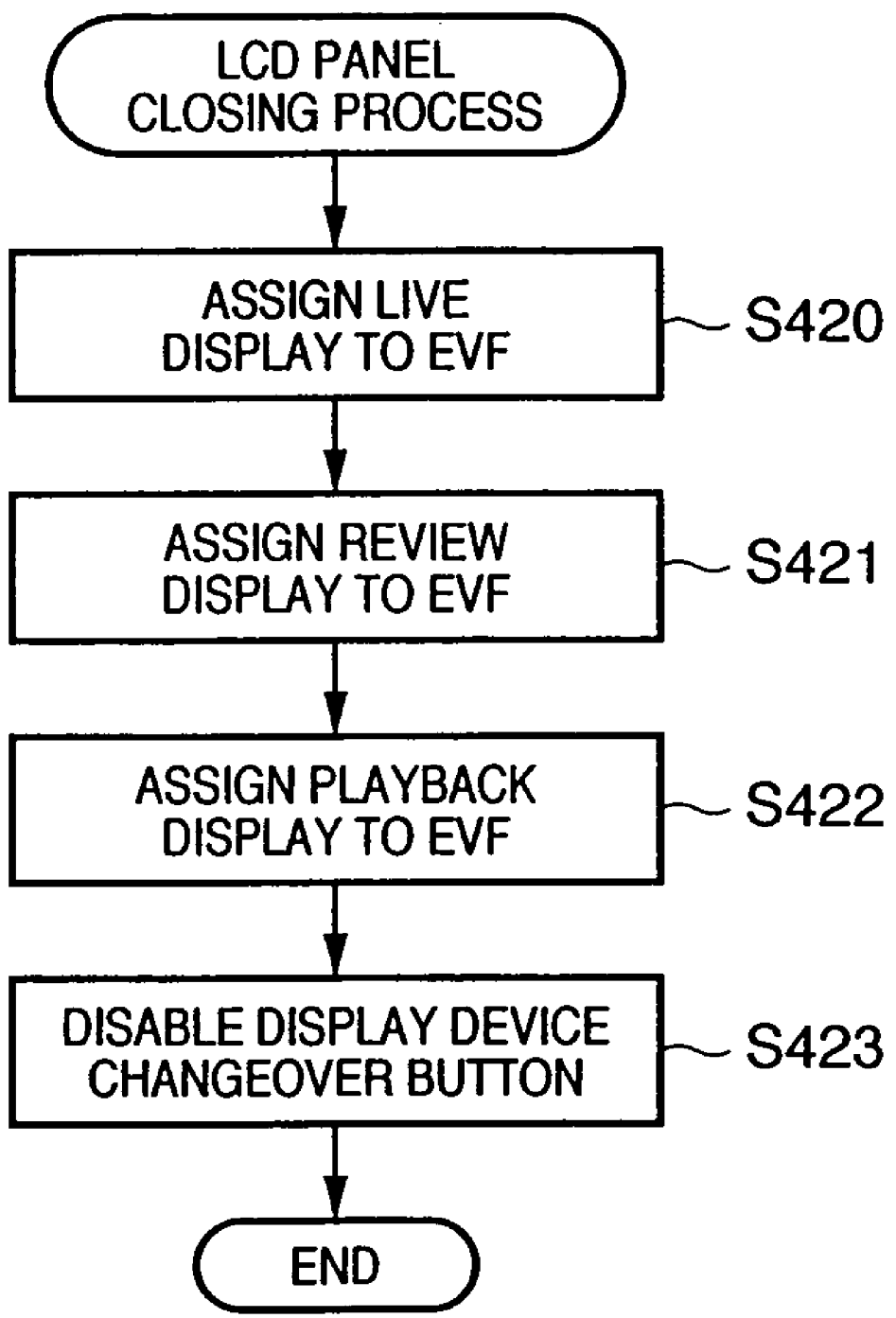
FIG. 21 is a flowchart of an LCD panel opening process according to the fifth embodiment of the present invention.

With the process in FIG. 21, when the LCD 28 is closed, the EVF displays an image in each of the display processes in steps S100 and S106 and step S200 in FIG. 8, and the display device changeover switch 66 is disabled. Negative determinations are always made in steps S101 and S107 in FIG. 2 and step S201 in FIG. 8, and the display device changeover operation is disabled.

As described above, if the LCD 28 is made up of an openable panel, to which display the display is performed is automatically changed in accordance with the open/closed state of the LCD 28.

It should be noted that the processes in steps S401 to S404 in FIG. 19, processes in steps S411 to S413 in FIG. 20, and processes in steps S421 to S423 in FIG. 21 may be performed in no particular order.

Sixth Embodiment

The sixth embodiment of the present invention will be described next.

The sixth embodiment will describe a case with a quick review function which performs quick review display after image sensing for only a predetermined period of time regardless of the presence or absence of an instruction from an operation unit 70, and a review-hold function which continues to perform review display after a lapse of the predetermined period of time.

Figure 22:
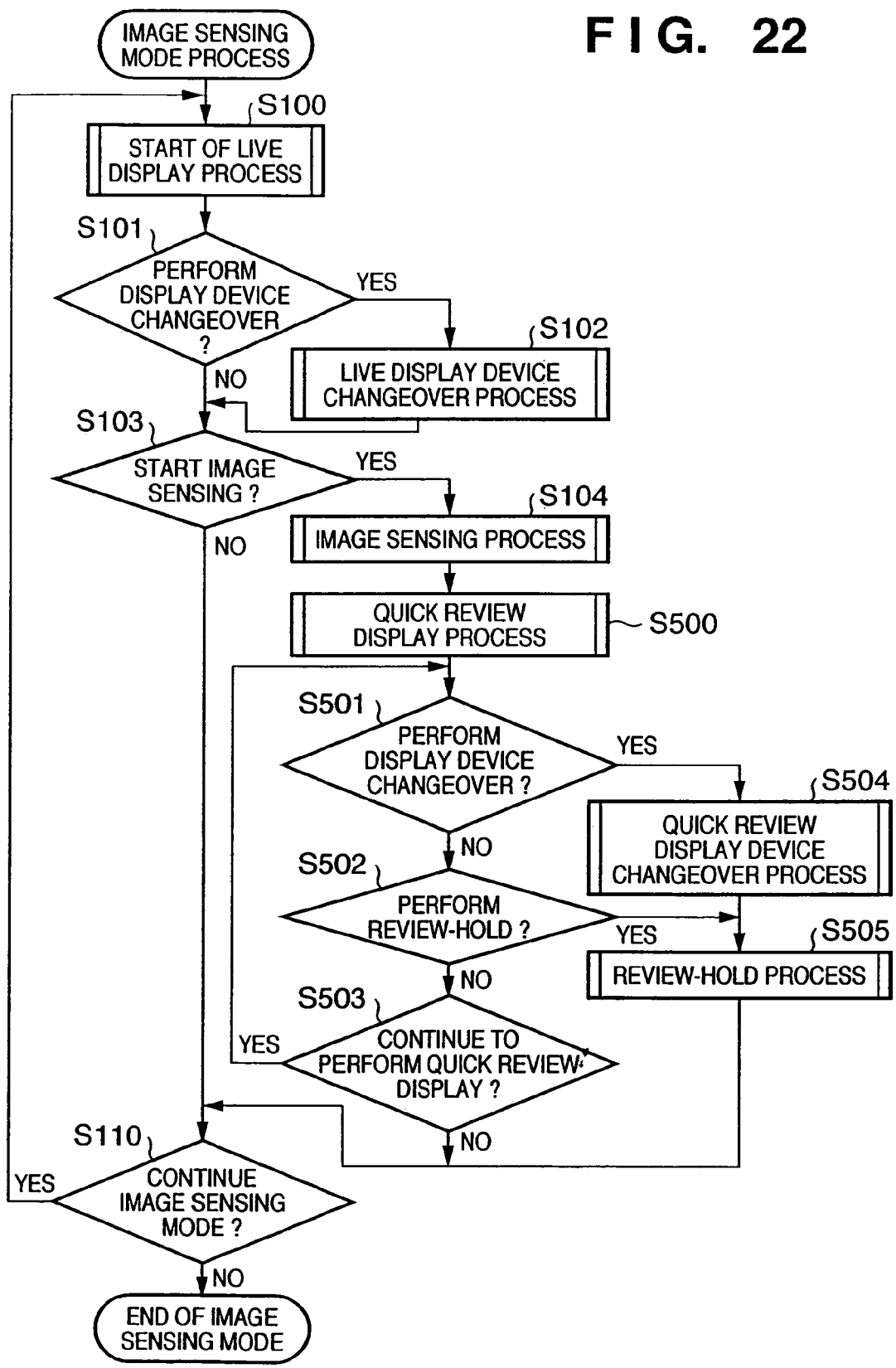
FIG. 22 is a flowchart showing a process in an image sensing mode according to the sixth embodiment of the present invention.

FIG. 22 is a flowchart showing a process in the image sensing mode of an image sensing apparatus 100 according to the sixth embodiment. In FIG. 22, the processes in steps S100 to S104 and S110 are the same as those which are described in the first embodiment with reference to FIG. 2 and are denoted by the same step numbers, and a description thereof will be omitted. A review process after image sensing will be described in detail as a characteristic feature of the sixth embodiment.

After an image sensing process ends in step S104 of FIG. 22, in step S500, a quick review display process which promptly performs review display for the predetermined period of time regardless of the presence or absence of an instruction from an operation unit 70 is performed.

Figure 23:
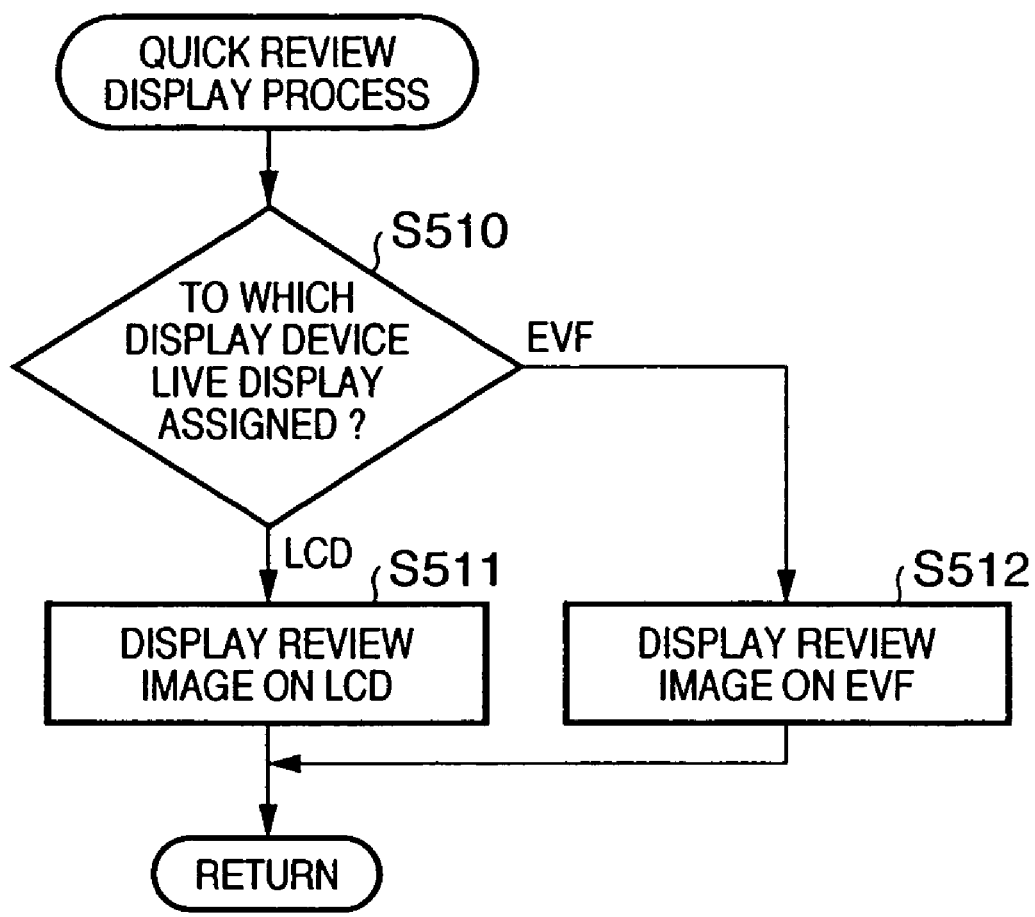
FIG. 23 is a flowchart of a quick review display process according to a sixth embodiment of the present invention.

FIG. 23 is a flowchart showing in detail the quick review display process performed in step S500.

In step S510, it is determined to which display device live display is assigned. If the LCD is assigned, the flow advances to step S511 to display a review image on an LCD 28. On the other hand, if the EVF is assigned to live display, the flow advances to step S512 to display the review image on an EVF 32.

In step S501 of FIG. 22, it is determined whether a display device changeover switch 66 is operated during the quick review display. If NO in step S501, the flow advances to step S502; otherwise, the flow advances to step S504 to perform a quick review display device changeover process by a system controller 50.

Figure 24:
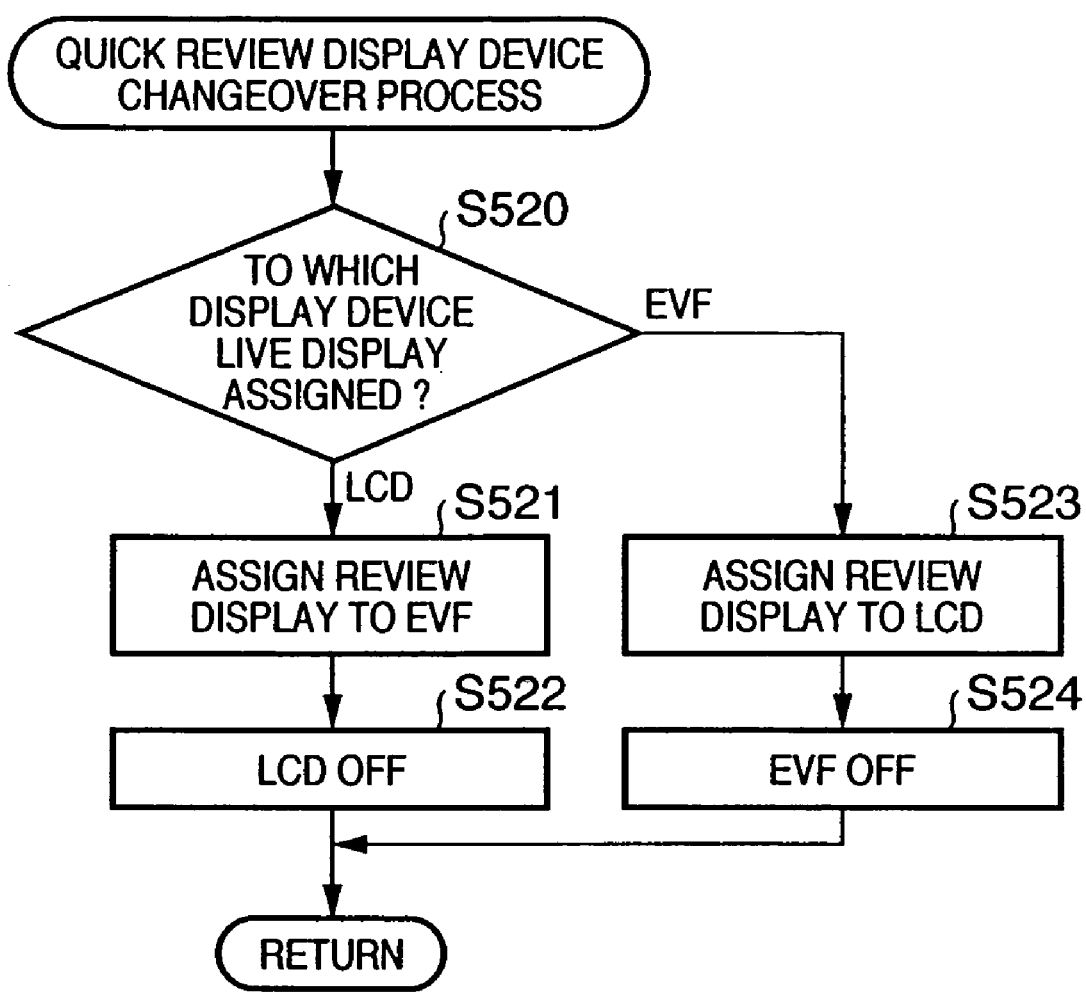
FIG. 24 is a flowchart of a quick review display device changeover process according to the sixth embodiment of the present invention.

FIG. 24 is a flowchart showing in detail the quick review display device changeover process performed in step S504.

In step S520, it is determined to which display device live display is currently assigned. If the LCD is assigned, the flow advances to step S521 to change assignment of review display to EVF. In step S522, the LCD 28 is turned off, and the flow returns to FIG. 22.

On the other hand, if it is determined in step S520 that EVF is assigned to live display, the flow advances to step S523 to change the assignment of review display to LCD. In step S524, the EVF 32 is turned off, and the flow returns to FIG. 22. The processes in steps S522 and S524 need not be performed at the above-mentioned timings. For example, the processes may be performed after review display in a review-hold process (to be described later) or may not be performed.

In step S501 of FIG. 22, if it is determined that display device changeover need not be performed, the flow advances to step S502. In step S502, it is determined whether the operation unit 70 is operated to give a review-hold instruction for continuing to perform review display after a lapse of the predetermined quick review display period of time. If NO in step S502, the flow advances to step S503. Unless the predetermined quick review display period of time has lapsed or the operation unit 70 is operated to give a quick review display end instruction, the flow returns to step S501, and the system controller 50 continues to perform quick review display.

On the other hand, if the review-hold instruction is given in step S502 or after the quick review display device changeover process in step S504, the flow advances to step S505 to perform the review-hold process.

Figure 25:
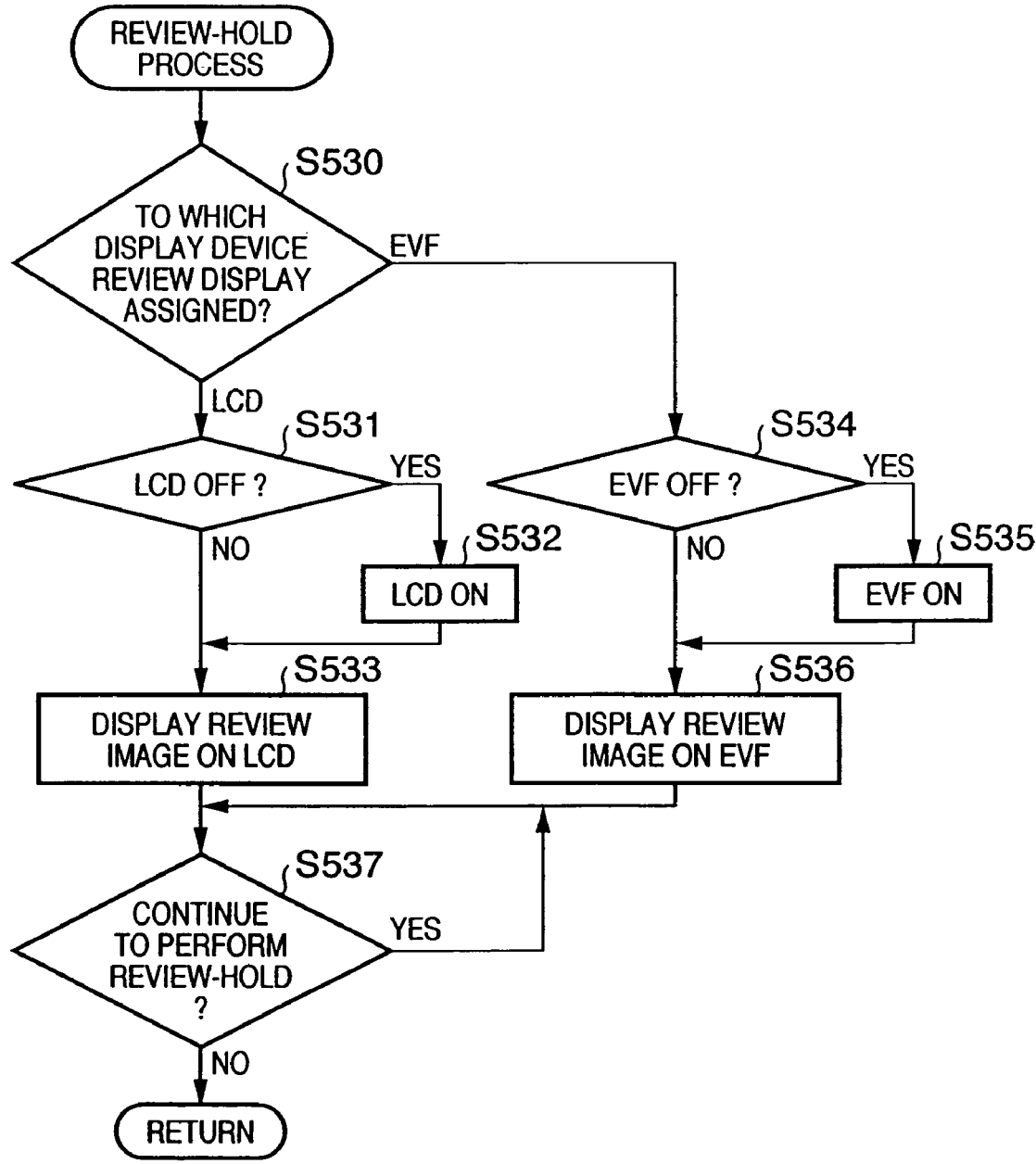
FIG. 25 is a flowchart of a review-hold process according to the sixth embodiment of the present invention.

FIG. 25 is a flowchart showing in detail the review-hold process performed in step S505.

In step S530, it is determined to which display device review display is assigned. If no display device is assigned to review display, a display device to which live display is assigned is determined, as in the quick review display process described with reference to FIG. 23. If the LCD is assigned, the flow advances to step S531. If the LCD 28 is in the OFF state, the flow advances to step S532 to turn on the LCD 28. Then, the review image is displayed on the LCD 28 (step S533).

On the other hand, if it is determined in step S530 that the EVF is assigned, the flow advances to step S534. If the EVF 32 is in the OFF state, the flow advances to step S535 to turn on the EVF 32. Then, the review image is displayed on the EVF 32 (step S536).

After the review image display in step S533 or S536, unless the operation unit 70 is operated to give a review-hold end instruction in step S537 (while YES in step S537), the system controller 50 continues to perform review-hold and display the review image.

As described above, the sixth embodiment makes it possible to continue image sensing without breaking the flos while roughly checking sensed images by displaying a quick review image on the live display device. Also, the operation unit 70 or display device changeover switch 66 is operated during quick review display to perform the review-hold process, and at the same time, the review display device is changed over to the review display. With this operation, the focus of a sensed image and the like can be checked in detail.

Although the sixth embodiment has described a case wherein display device changeover is not performed in review-hold display, it may be performed. In this case, the process shown in FIG. 7 only needs to be performed in response to operation of the display device changeover switch 66. Note that the process in FIG. 25 is to be performed instead of the process in step S165 of FIG. 7.

Further, the sixth embodiment has described a case wherein if the display device changeover switch 66 is operated during quick review display, assignment of review display is changed from a display device to another display device, and review-hold is performed. Alternatively, a display device for review-hold may be assigned in advance. In this case, control is so performed as to shift to review-hold and a review image is displayed on the predetermined display device if an arbitrary operation member is operated in a predetermined manner during quick review display.

The above-mentioned first to sixth embodiments employ devices such as an EVF or LCD as the plurality of display devices. Any other display device such as a TFT may be employed, and the present invention is not limited to a specific type of display device.

Also, the embodiments use two display devices. Three or more display devices may be provided. In this case, the display devices may be selected in rotation every operation of the display device changeover switch 66.

The first to sixth embodiments have not described the initial setting of the display device for each display mode. The settings may be initialized to predetermined values when the power is ON. Alternatively, the settings may be stored upon power-down, and initialization may be performed in accordance with the stored settings when the power is ON.

Alternatively, some of the current settings may be stored upon power-off. When the power is ON, initialization may be performed in accordance with the stored settings, and the remaining settings may be initialized to predetermined values.

If each display device can be retracted, the initial settings can be changed in accordance with the retraction state of the display device.

The present invention may be implemented by combining the aforementioned embodiments or their technical elements as needed.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus, which electrically senses an object and stores obtained image data in a storage medium, comprising:
   a plurality of image display units;
   a selection unit which, while displaying image data on one of said plurality of image display units in each of a plurality of different display modes, selects an image display unit for image data display in each of the plurality of display modes out of said plurality of image display units by changing a display destination of the image data to another image display device;
   a storage unit which stores the image display unit selected by said selection unit for each of the plurality of display modes; and
   a display control unit which controls to display image data on the image display unit stored in said storage unit in accordance with the display mode,
   wherein the plurality of display modes include at least a live display mode in which an object image is sequentially displayed substantially in real time, and a review display mode in which a sensed image is displayed immediately after image sensing for a predetermined period of time, and
   wherein when a predetermined operation member is operated within the predetermined period of time in the review display mode, review display is continued regardless of the predetermined period of time.

2. The apparatus according to claim 1, wherein the predetermined operation member comprises said selection unit, and when a changeover between image display devices is performed using said selection unit, review display is continued regardless of the predetermined period of time.

3. The apparatus according to claim 1, wherein when said selection unit selects another image display unit while displaying image data in the live display mode, the newly selected image display unit is stored in said storage unit as an image display unit for the review display mode.

4. The apparatus according to claim 1, wherein when said selection unit selects another image display unit while displaying image data in the review display mode, the newly selected image display unit is stored in said storage unit as an image display unit for the live display mode.

5. An image sensing apparatus, which electrically senses an object and stores obtained image data in a storage medium, comprising:
   a plurality of image display units;
   a selection unit which, while displaying image data on one of said plurality of image display units in each of a plurality of different display modes, selects an image display unit for image data display in each of the plurality of display modes out of said plurality of image display units by changing a display destination of the image data to another image display device;
   a storage unit which stores the image display unit selected by said selection unit for each of the plurality of display modes; and
   a display control unit which controls to display image data on the image display unit stored in said storage unit in accordance with the display mode,
   wherein the display modes include a mode of displaying image data in a playback mode in which image data sensed by the image sensing apparatus is played back,
   wherein in the playback mode, said storage unit stores as an image display unit for the playback mode the image display unit selected by said selection unit, and
   wherein when said selection unit selects another image display unit while displaying image data in the playback mode, the newly selected image display unit is stored in said storage unit as an image display unit for a review display mode, and when said selection unit selects another image display unit while displaying image data in the review display mode, the newly selected image display unit is stored in said storage unit as the image display unit for the playback display mode.

6. A method of controlling an image sensing apparatus which has a plurality of image display units, electrically senses an object, and stores obtained image data in a storage medium, comprising:
   determining a display mode to be used out of a plurality of different display modes;
   displaying image data on one of the plurality of image display units in accordance with the determined display mode;
   changing over a display destination of the image data to another one of the plurality of the image display units; and
   storing said another image display unit in association with the determined display mode,
   wherein said changing over and storing are independently performed for the respective display modes, and in said displaying, control is so performed as to display image data on the stored image display unit in accordance with the display mode,
   wherein the plurality of display modes include at least a live display mode in which an object image is sequentially displayed substantially in real time, and a review display mode in which a sensed image is displayed immediately after image sensing for a predetermined period of time, and
   wherein when a predetermined operation member is operated within the predetermined period of time in the review display mode, review display is continued regardless of the predetermined period of time.

7. The method according to claim 6, wherein the predetermined operation member comprises a selection unit, and when a changeover between image display units is performed using the selection unit, review display is continued regardless of the predetermined period of time.

8. The method according to claim 6, wherein when the display destination is changed over to another image display unit in said changing over while displaying image data in the live display mode in said display, the newly selected image display unit is stored as an image display unit for the review display mode in said storing.

9. The method according to claim 6, wherein when another image display unit is selected in said changing over while displaying image data in the review display mode in said display, the newly selected image display unit is stored as an image display unit for the live display mode in said storing.

10. A method of controlling an image sensing apparatus which has a plurality of image display units, electrically senses an object, and stores obtained image data in a storage medium, comprising:

determining a display mode to be used out of a plurality of different display modes;

displaying image data on one of the plurality of image display units in accordance with the determined display mode;

changing over a display destination of the image data to another one of the plurality of the image display units; and storing said another image display unit in association with the determined display mode, wherein said changing over and storing are independently performed for the respective display modes, and in said displaying, control is so performed as to display image data on the stored image display unit in accordance with the display mode, wherein the display modes include a mode of displaying image data in a playback mode in which image data sensed by the image sensing apparatus is played back, and wherein in the playback mode, said another image display unit selected in said changing over is stored as an image display unit for the playback mode in the storage step, and wherein when another image display unit is selected in said changing over while displaying image data in the playback mode in said displaying, the newly selected image display unit is stored as an image display unit for a review display mode in said storing, and when another image display unit is selected in said changing over while displaying image data in the review display mode in said displaying, the newly selected image display unit is stored as the image display unit for the playback display mode in said storing.

* * * * *